US007961940B2

(12) United States Patent
Sato et al.

(10) Patent No.: US 7,961,940 B2
(45) Date of Patent: *Jun. 14, 2011

(54) IMAGE PROCESSING METHOD, IMAGE PROCESSING SYSTEM, AND IMAGE PROCESSING PROGRAM

(75) Inventors: Satoshi Sato, Osaka (JP); Kunio Nobori, Osaka (JP); Katsuhiro Kanamori, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/557,555

(22) Filed: Sep. 11, 2009

(65) Prior Publication Data

US 2010/0027879 A1 Feb. 4, 2010

Related U.S. Application Data

(62) Division of application No. 11/922,013, filed as application No. PCT/JP2006/313885 on Jul. 12, 2006, now Pat. No. 7,609,892.

(30) Foreign Application Priority Data

Aug. 19, 2005 (JP) ................................ 2005-239097

(51) Int. Cl.
*G06K 9/00* (2006.01)

(52) U.S. Cl. ........................................................ 382/162

(58) Field of Classification Search .................. 382/108, 382/118, 154, 162, 190; 700/259; 250/224; 356/601

See application file for complete search history.

(56) References Cited

U.S. PATENT DOCUMENTS

| | | | | |
|---|---|---|---|---|
| 4,873,651 | A | 10/1989 | Raviv | 700/259 |
| 7,039,222 | B2 | 5/2006 | Simon et al. | 382/118 |
| 7,609,892 | B2 * | 10/2009 | Sato et al. | 382/190 |

FOREIGN PATENT DOCUMENTS

| | | | |
|---|---|---|---|
| JP | 02-135986 | | 5/1990 |
| JP | 10-162146 | A | 6/1998 |
| JP | 11-265440 | A | 9/1999 |
| JP | 2002-117413 | A | 4/2002 |
| JP | 2002-197466 | A | 7/2002 |
| JP | 2002-262180 | A | 9/2002 |

(Continued)

OTHER PUBLICATIONS

Kazutoyo Takata et al., "Predicting a Background Image Using Photometric Linearization for a PTZ Camera", Advanced Technology Research Laboratories, Matsushita Electric Industrial Co., Ltd., Information Processing Society of Japan Kenkyu Hokoku (2005-CVIM-148), Mar. 3, 2005, vol. 2005, No. 18, pp. 221 to 226.

(Continued)

*Primary Examiner* — Duy M Dang
(74) *Attorney, Agent, or Firm* — Harness, Dickey & Pierce, P.L.C.

(57) ABSTRACT

The process captures a plurality of images under a light source whose luminance varies over time, such as a fluorescent lamp, under such an imaging condition that a plurality of images that are different from one another in terms of light source conditions can be captured (S11). The process detects a temporal luminance variation from the plurality of captured images (S12), estimates a shadow area by using the temporal luminance variation (S13), and performs an image process such as a process of synthesizing a linearized image or an image segmentation based on optical characteristics (S14).

4 Claims, 35 Drawing Sheets

FOREIGN PATENT DOCUMENTS

JP 2004-021373 A 1/2004

OTHER PUBLICATIONS

Akihiro Okumura et al., "Moving Object Detection in the Open Air Environment," Meeting on Image Recognition and Understanding (MIRU 2000), vol. II, pp. 307-312, 2000 (and a partial translation thereof).

Yasunori Ishii et al., "Photometric Linearization Based on Classification of Photometric Factors," Journal of Information Processing Society of Japan, vol. 44, No. SIG5 (CVIM6), pp. 11-21, 2003.

Shinichiro Haruyama, "Visible Light Communication," Journal of the Institute of Electronics, Information and Communication Engineers, vol. J86-A, No. 12, pp. 1284-1291, 2003 (and a partial translation thereof).

Tsutomu Tokunaga et al., "Development of a New Driving Method for AC-PDPs," Pioneer R&D, vol. 11, No. 1, pp. 1-12, 2003.

Jianbo Shi et al., "Good Features to Track," IEEE Conference on Computer Vision and Pattern Recognition, pp. 593-600, 1994.

Atsuhiko Banno et al., "Removing Specularities of Vehicles from Image Sequences by using Spacio-Temporal Images Taken by a Moving Camera," Information Processing Society of Japan Technical Report, CVIM, 2003-CVIM-141, pp. 17-23, 2003.

Amnon Shashua, "Geometry and Photometry in 3D Visual Recognition," Ph.D. thesis, Dept. of Brain and Cognitive Sciences, MIT, 1992.

Martin A. Fischler et al., "Random Sample Consensus: A Paradigm for Model Fitting with Applications to Image Analysis and Automated Cartography," Communications of the ACM, vol. 24, Issue 6, pp. 381-395, 1981.

Hideki Hayakawa, "Photometric Stereo under a Light Source with Arbitrary Motion," Journal of the Optical Society of America A, vol. 11, pp. 3079-3089, 1994.

Satoshi Sato et al., "Evaluation of Photometric Linearization of Images Obtained under Point Light Source," Information Processing Society of Japan Technical Report 2004-CVIM-145, pp. 151-156, 2004.

Takahiro Okabe et al., "Effects of Image Segmentation for Approximating Object Appearance under Near Lighting," Technical Report of the Institute of Electronics, Information and Communication Engineers, PRMU 2004-148, pp. 1-6, 2004.

Katsumi Mori et al., "Estimation of Object Color, Light Source Color, and Direction by Using a Cuboid," System and Computers in Japan, vol. 36, No. 12, 2005, Translated from Denshi Joho Tsushin Gakkai Ronbunshi, Vol. J87-DII, No. 10, Oct. 2004, pp. 1973-1982, © Wiley Periodicals, Inc., pp. 1-10.

* cited by examiner (a)

(b)

(a) Input image (b) Temporal luminance variation of each pixel (c) Results of shadow area estimation (d) Linearized image (a) Input image (b) Temporal luminance variation of each pixel (c) High-SN input image (d) Latest high-SN input image (e) Synthesized background image (f) Results of detecting moving object (a)

(b)

(a)

(b)

IMAGE PROCESSING METHOD, IMAGE PROCESSING SYSTEM, AND IMAGE PROCESSING PROGRAM

CROSS-REFERENCE TO RELATED APPLICATIONS

This application is a divisional of U.S. patent application Ser. No. 11/922,013 filed on Dec. 11, 2007, which matured into U.S. Pat. No. 7,609,892 on Oct. 27, 2009, which is a National Stage of International Application No. PCT/JP2006/313885 filed Jul. 12, 2006 which claims the benefit and priority of Japanese Patent Application No. 2005-239097 filed Aug. 19, 2005. The entire disclosures of each of the above applications are incorporated herein by reference.

TECHNICAL FIELD

The present invention relates to image capturing and image processing for use in an ordinary living space, such as in a house, for example.

BACKGROUND ART

There are demands for realizing a physical support robot for use in an ordinary living environment such as in a house. In order to realize such a robot, it is necessary to realize processes such as detecting the position and the posture of an object, recognizing the object, detecting the motion of the object, and recognizing the environment.

For performing such processes, methods using cameras have been widely used in conventional methods. This is realized by performing an image process, such as pattern matching, optical flow detection and feature point extraction, on images captured by a camera.

It is known that in an ordinary living environment such as in a house, the accuracy and the detection rate of these image processes are deteriorated by the influence of specular reflection/shadows due to light source variations. In view of this, researches have been conducted on image processes that are robust against the influence of light source variations (e.g., photometric linearization), using a reflection model such as a dichromatic reflection model or a Lambertian model (for example, Non-Patent Documents 1 and 2).

In Non-Patent Document 1, the color of an object observed under an outdoor environment is considered as being composed of an all-sky light component that does not vary over time, and a direct sunlight component whose brightness varies rapidly when the direct sunlight is blocked by a cloud. When performing a background subtraction method for detecting a moving object, the mixing ratio of the direct sunlight component, which varies substantially over time, is estimated, thereby realizing a detection of a moving object that is not influenced by shadows and the luminance variation of the light source.

Non-Patent Document 2 uses a plurality of images through which the light source position varies to produce linearized images each being a synthetic image that is composed of only diffuse reflection and does not include specular reflection or shadows. By using such linearized images, it is possible to realize an image process that is not influenced by specular reflection.

Non-Patent Document 1: Akihiro Okumura, Yoshio Iwai, Masahiko Yachida, "Moving Object Detection in the Open Air Environment", Meeting on Image Recognition and Understanding (MIRU 2000), vol. II, pp. 307-312, 2000

Non-Patent Document 2: Yasunori Ishii, Koutaro Fukui, Yasuhiro Mukaigawa, Takeshi Shakunaga, "Photometric Linearization Based on Classification of Photometric Factors", Journal of Information Processing Society of Japan, vol. 44, no. SIG5 (CVIM6), pp. 11-21, 2003

DISCLOSURE OF THE INVENTION

Problems to be Solved by the Invention

Many of these image processing methods based on optical models require a plurality of images that are different from one another in terms of the position or the luminance of the light source. For example, Non-Patent Document 1 requires two or more images that are different from one another in terms only of the luminance of the direct sunlight component, in order to estimate the all-sky light component and the direct sunlight component. Non-Patent Document 2 requires four or more images that are different from one another in terms of the light source position.

Such a plurality of images that are different from one another in terms of the luminance or the position of the light source are referred to herein as "light source-varied images". Typically, capturing such light source-varied images requires varying the position and the luminance of the light source and capturing images in synchronism with the variations. With this method, however, it is necessary to realize synchronism between the light source and the camera, thus requiring a large-scale system and increasing the imaging cost.

FIG. 36 shows an example of a conventional imaging system for capturing light source-varied images. First, an object 201 and an imaging device 202 are fixed, and rails 203 are provided around the object 201. A light source 204 can be fixed at various positions on the rails 203. The imaging device 202 can capture light source-varied images by capturing images in synchronism with the variations of the position and the luminance of the light source 204. With this system, however, it is necessary to provide the rails 203 surrounding the object 201, whereby the scale of the system will be very large. Particularly, if the object 201 is a large object, it will be very difficult to provide such a system. Since the imaging device 202 needs to capture images in synchronism with variations of the position and the luminance of the light source 204, the control will be complicated and the image capturing will require a long period of time.

Recently, in order to record great statues of Buddha or buildings as digital archives, or to display in computer graphics (CG) the environment in an office or in a house, it may be necessary to capture a plurality of images through which the position and the luminance of the light source vary. In such cases, where the object is very large, image capturing will be very difficult with the method of FIG. 36.

When performing an image process (e.g., photometric linearization) where it is acceptable that the light source position is unknown, a cameraman or an imaging robot 205 may hold the light source 204 in a hand, being a movable part, and capture images by means of the imaging device 202 while moving the light source 204, as shown in FIG. 37. However, this requires a complicated operation of moving the light source while fixing the position of the camera, and also presents a problem in that the image capturing will take a long period of time.

In view of the problems set forth above, an object of the present invention is to make it possible to obtain so-called "light source-varied images" for use in image processes with simple facilities.

Means for Solving the Problems

The present invention images the same object a plurality of times by means of an imaging device under a light source whose luminance varies over time under such an imaging condition that a plurality of images that are different from one another in terms of light source conditions can be captured, and performs an image process by using a plurality of captured images.

The present invention determines such an imaging condition that a plurality of images that are different from one another in terms of the light source conditions can be captured by means of an imaging device by using a light source whose luminance varies over time, and then captures a plurality of images. Thus, it is possible to easily obtain so-called "light source-varied images" without requiring a large-scale system or a complicated operation.

The present invention images the same object a plurality of times by means of an imaging device under a light source whose luminance varies over time, detects a temporal variation of a luminance value for each of a plurality of corresponding points in the plurality of captured images, and determines whether light source conditions of the plurality of images are different from one another based on the temporal variation of the luminance value for each of the corresponding points to save, as light source-varied images, those of the plurality of images that are different from one another in terms of the light source conditions while discarding other images.

The present invention captures a plurality of images by means of an imaging device by using a light source whose luminance varies over time. Then, only those images that are different from one another in terms of the light source conditions are saved as light source-varied images, based on the temporal variation of the luminance value for each of the corresponding points set commonly in the plurality of images. Thus, it is possible to easily obtain so-called "light source-varied images" without requiring a large-scale system or a complicated operation.

Effects of the Invention

According to the present invention, it is possible to easily capture so-called "light source-varied images" that are different from one another in terms of the position or the luminance of the light source by means of a very simple device in an ordinary living environment such as in a house. By using such images, it is possible, even in an ordinary living environment, to perform an image process that is not influenced by shadows and luminance variations of the light source.

DESCRIPTION OF REFERENCE NUMERALS

Figure 1:
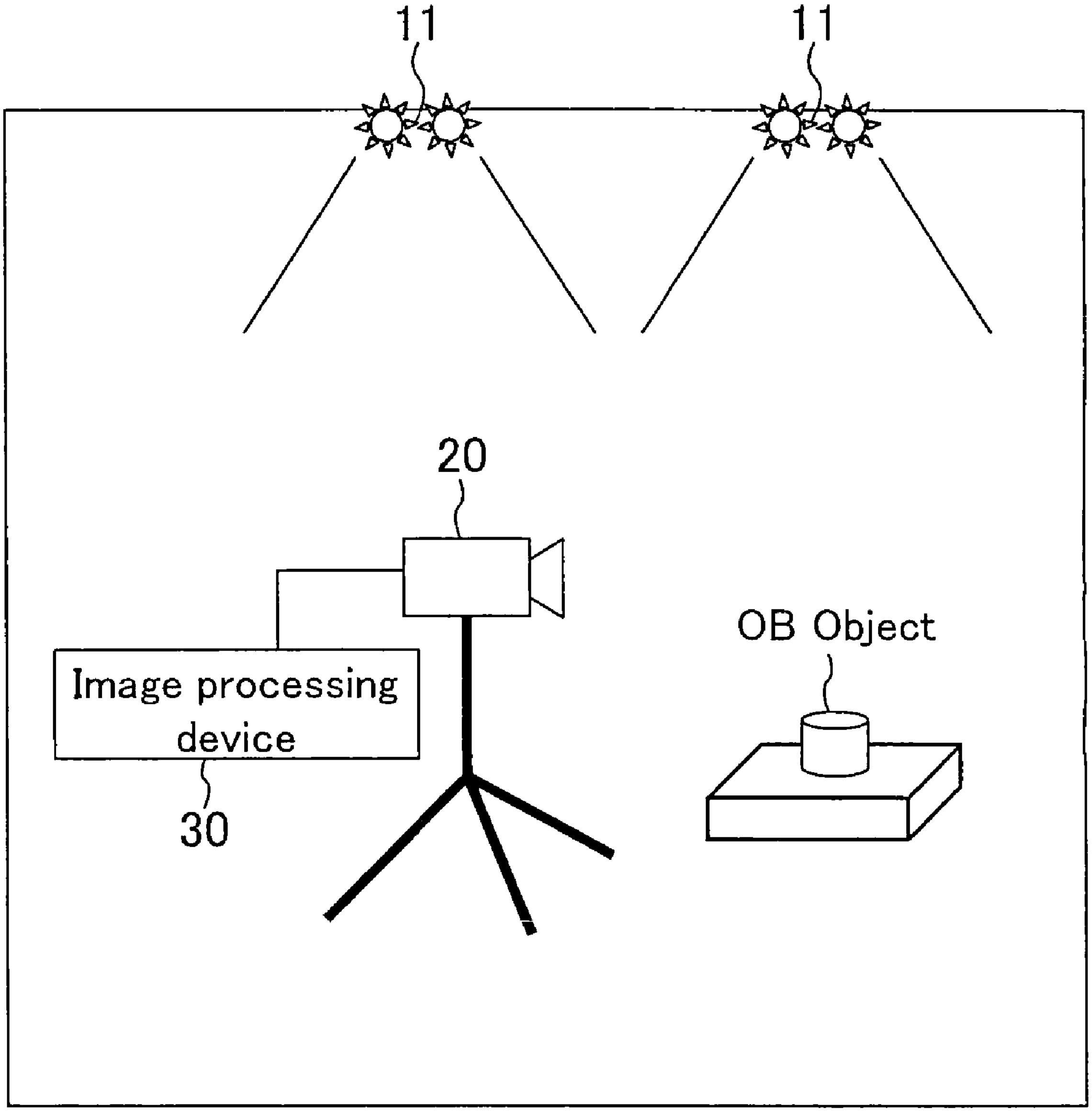
FIG. 1 is a diagram showing a configuration for realizing an image processing method according to a first embodiment of the present invention.

11, 11*a* and 11*b* Light source
20 Imaging device
30 Image processing device
40 Imaging control device
50 Light source control device
OB Object

BEST MODE FOR CARRYING OUT THE INVENTION

A first aspect of the present invention is directed to an image processing method, including: an imaging step of imaging a same object a plurality of times by means of an imaging device under a light source whose luminance varies over time under such an imaging condition that a plurality of images that are different from one another in terms of light source conditions can be imaged; and an image processing step of performing an image process by using a plurality of images imaged in the imaging step, wherein the image processing step includes: a step of detecting a temporal luminance variation from the plurality of images; a step of estimating a shadow area in the plurality of images by using the detected temporal luminance variation; and a step of performing at least one of producing a photometric linearized image, an image segmentation based on optical characteristics, estimating shape information of the object, estimating optical information of the object and estimating light source information by using information of the estimated shadow area and the plurality of images.

A second aspect of the present invention is directed to an image processing method, including: an imaging step of imaging a same object a plurality of times by means of an imaging device under a light source whose luminance varies over time under such an imaging condition that a plurality of images that are different from one another in terms of light source conditions can be imaged; and an image processing step of performing an image process by using a plurality of images imaged in the imaging step, wherein the image processing step is a step of estimating a color vector of the light source.

A third aspect of the present invention is directed to the image processing method of the first or second aspect, wherein: the light source is a light source whose luminance varies periodically; and an exposure time that is sufficiently short with respect to a luminance variation cycle of the light source is set as the imaging condition.

A fourth aspect of the present invention is directed to the image processing method of the first or second aspect wherein the light source is a fluorescent lamp, an LED or a display.

A fifth aspect of the present invention is directed to the image processing method of the first or second aspect, wherein the imaging condition is at least one of an exposure time, an imaging timing and an imaging cycle.

A sixth aspect of the present invention is directed to the image processing method of the first or second aspect, including: a step of obtaining the light source information; and a step of determining the imaging condition based on the obtained light source information.

A seventh aspect of the present invention is directed to the image processing method of the sixth aspect, wherein the light source information is at least one of a luminance variation cycle, a luminance variation range and position information of the light source.

An eighth aspect of the present invention is directed to an image processing method, including: an imaging step of imaging a same object a plurality of times by means of an imaging device under a light source whose luminance varies over time under such an imaging condition that a plurality of images that are different from one another in terms of light source conditions can be imaged; and an image processing step of performing an image process by using a plurality of images imaged in the imaging step, wherein the image processing step includes: a step of obtaining a luminance variation range for each of a plurality of corresponding points in the plurality of images; and a step of performing an image segmentation based on a distance from the light source by using the luminance variation range obtained for each of the corresponding points.

A ninth aspect of the present invention is directed to an image processing method, including: an imaging step of imaging a same object a plurality of times by means of an imaging device under a light source whose luminance varies over time; a luminance variation detection step of detecting a temporal variation of a luminance value for each of a plurality of corresponding points in the plurality of images imaged in the imaging step; and an image determination step of determining whether light source conditions of the plurality of images are different from one another based on the temporal variation of the luminance value for each of the corresponding points to save, as light source-varied images, those of the plurality of images that are different from one another in terms of the light source conditions while discarding other images.

A tenth aspect of the present invention is directed to the image processing method of the ninth aspect, including a light source controlling step of controlling a luminance of the light source by means of a light source control device so that the luminance varies over time.

An eleventh aspect of the present invention is directed to an image processing system, including: an imaging device for imaging a same object a plurality of times under a light source whose luminance varies over time under such an imaging condition that a plurality of images that are different from one another in terms of light source conditions can be imaged; and an image processing device for performing an image process by using a plurality of images imaged by the imaging device.

A twelfth aspect of the present invention is directed to a program for instructing a computer to perform an image process, wherein the program instructs the computer to perform: an imaging step of imaging a same object a plurality of times by means of an imaging device under a light source whose luminance varies over time under such an imaging condition that a plurality of images that are different from one another in terms of light source conditions can be imaged; and an image processing step of performing an image process by using a plurality of images imaged in the imaging step, wherein the image processing step includes a step of detecting a temporal luminance variation from the plurality of images; a step of estimating a shadow area in the plurality of images by using the detected temporal luminance variation; and a step of performing at least one of producing a photometric linearized image, an image segmentation based on optical characteristics, estimating shape information of the object, estimating optical information of the object and estimating light source information by using information of the estimated shadow area and the plurality of images.

A thirteenth aspect of the present invention is directed to a program for instructing a computer to perform an image process, wherein the program instructs the computer to perform: an imaging step of imaging a same object a plurality of times by means of an imaging device under a light source whose luminance varies over time under such an imaging condition that a plurality of images that are different from one another in terms of light source conditions can be imaged; and an image processing step of performing an image process by using a plurality of images imaged in the imaging step, wherein the image processing step is a step of estimating a color vector of the light source.

Embodiments of the present invention will now be described with reference to the drawings.

First Embodiment

FIG. 1 is a diagram showing a configuration for realizing an image processing method according to a first embodiment of the present invention. In FIG. 1, an object OB is illuminated by a plurality of light sources 11 whose luminance varies over time, and is imaged a plurality of times successively by means of an imaging device 20, such as a camera. In this process, imaging conditions, such as the exposure time, the imaging timing and the imaging cycle, are set so that a plurality of images that are different from one another in terms of the light source conditions can be captured. The plurality of captured images are sent to an image processing device 30, which performs an image process such as shadow area estimation. The imaging device 20 and the image processing device 30 together form an image processing system of the present invention.

Figure 2:
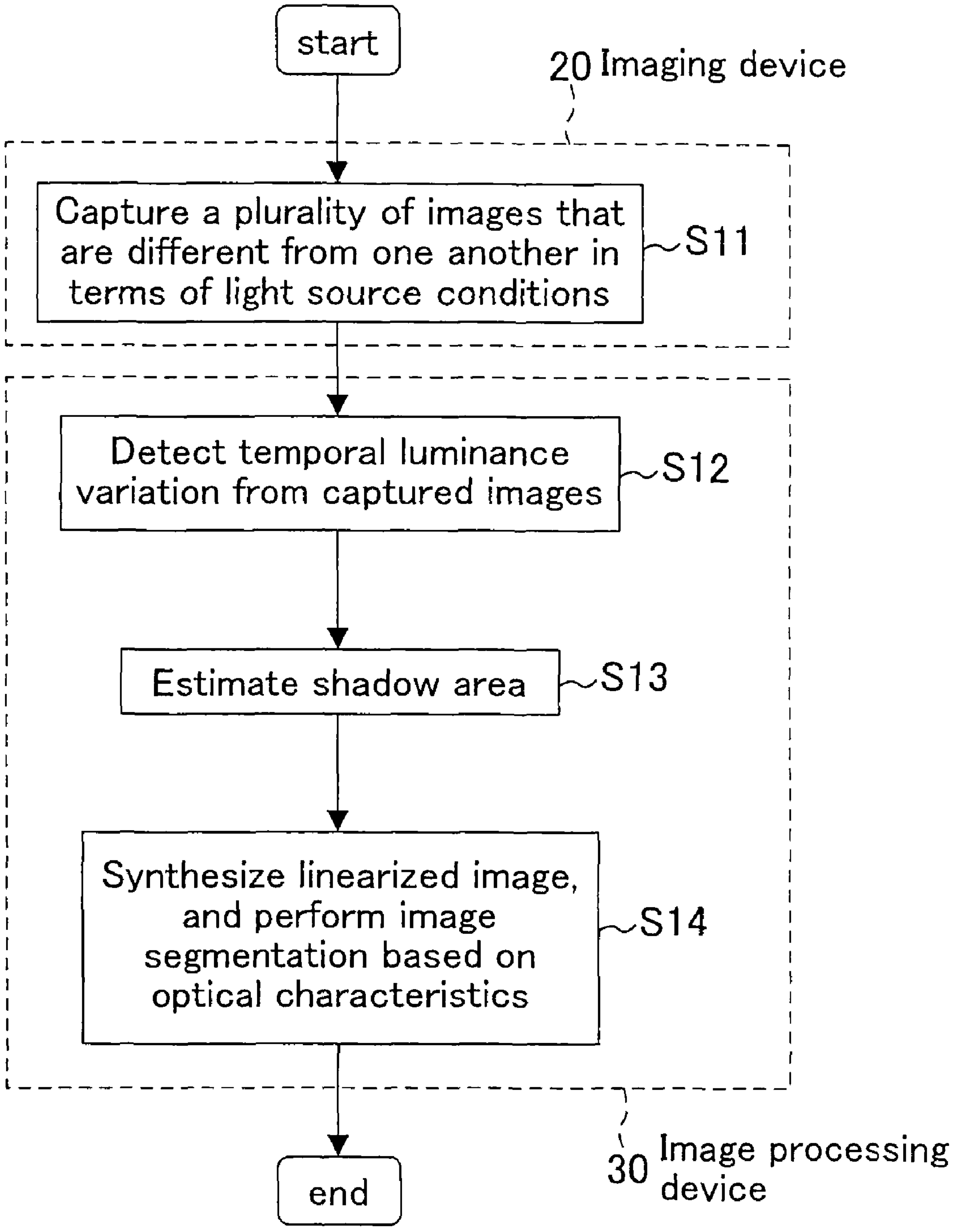
FIG. 2 is a flow chart showing processes of an image processing method according to the first embodiment of the present invention.

FIG. 2 is a flow chart showing processes of an image processing method of the present embodiment. The imaging device 20 shown in FIG. 1 images, a plurality of times, the object OB illuminated by the plurality of light sources 11 whose luminance varies over time under imaging conditions where the exposure time is shorter than the luminance variation cycle of the light sources 11 (step S11). The plurality of images captured in this way are images through which the light source conditions vary in time series. The image processing device 30 first detects the temporal luminance variation from the plurality of captured images (step S12), and estimates the shadow area in the images by using the detected temporal luminance variation (step S13). Moreover, a photometric linearization process is performed using the estimated shadow area information to synthesize linearized images each composed of only a diffuse reflection component and including no specular reflection or no shadow. Alternatively, an image segmentation based on optical characteristics is performed (step S14). Step S11 corresponds to the imaging step, and steps S12 to S14 correspond to the image processing step. These steps will now be described successively and in detail.

First, in step S11, the object OB, which is illuminated by the plurality of light sources 11 whose positions are fixed and whose luminance varies over time, is imaged a plurality of times by means of the imaging device 20 under imaging conditions where the exposure time is shorter than the luminance variation cycle of the light sources 11.

The light sources 11 used in the present embodiment may be fluorescent lamps, for example. Fluorescent lamps are widely used as light sources in a house. The principle of light emission by a fluorescent lamp is as follows. As a voltage is applied across the lamp, electrons emitted from an electrode accelerate and hit mercury. The mercury is excited by the hitting to generate ultraviolet rays, which are converted into visible light through a phosphor. Due to such a principle, an AC-powered fluorescent lamp is alternately lit and dimmed according to the AC frequency, thereby resulting in the luminance varying over time.

Since the AC frequency is 50 Hz and 60 Hz in Eastern Japan and in Western Japan, respectively, the blinking frequency of a fluorescent lamp is 100 Hz and 120 Hz, respectively, whereby the blinking is usually not observed by human eyes.

However, where the exposure time is set to be shorter than the blinking cycle of the fluorescent lamp, and the imaging timing (imaging cycle) is set to be different from the blinking frequency, images through which the luminance varies over time are captured even if the object is stationary and the camera position is fixed. Such a luminance variation is known as a flicker, and is conventionally considered to be a significant problem in image processes (see, for example, Japanese Laid-Open Patent Publication No. 2-135986). In contrast, the present embodiment makes use of a flicker, which is considered to hinder image processes, whereby it is possible to easily capture so-called "light source-varied images", being different from one another in terms of the light source conditions, such as the luminance or the position of the lighting device, which were very difficult to obtain with conventional methods.

Figure 3:
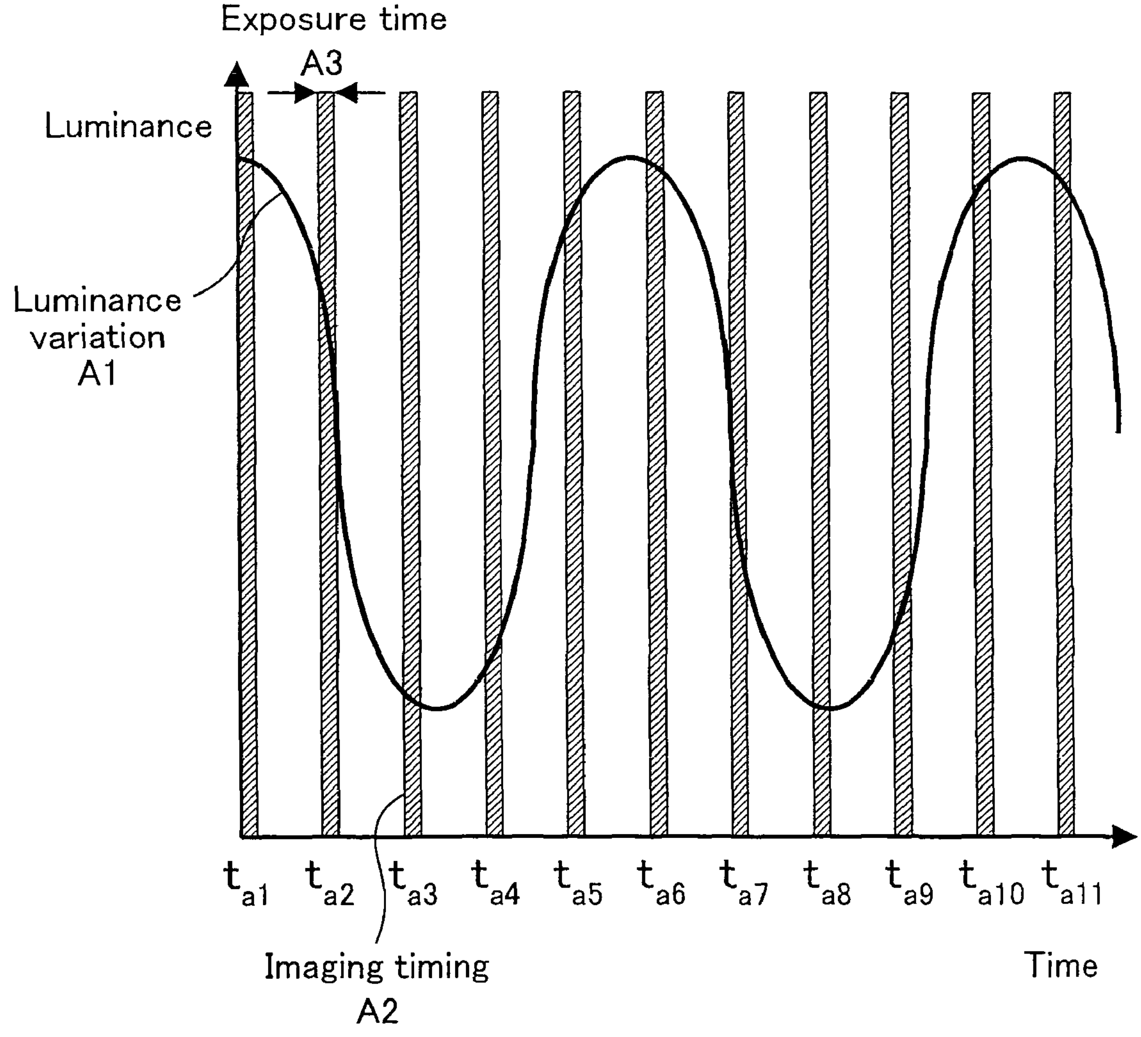
FIG. 3 is a conceptual diagram illustrating the influence of a light source whose luminance varies.
Figure 4:
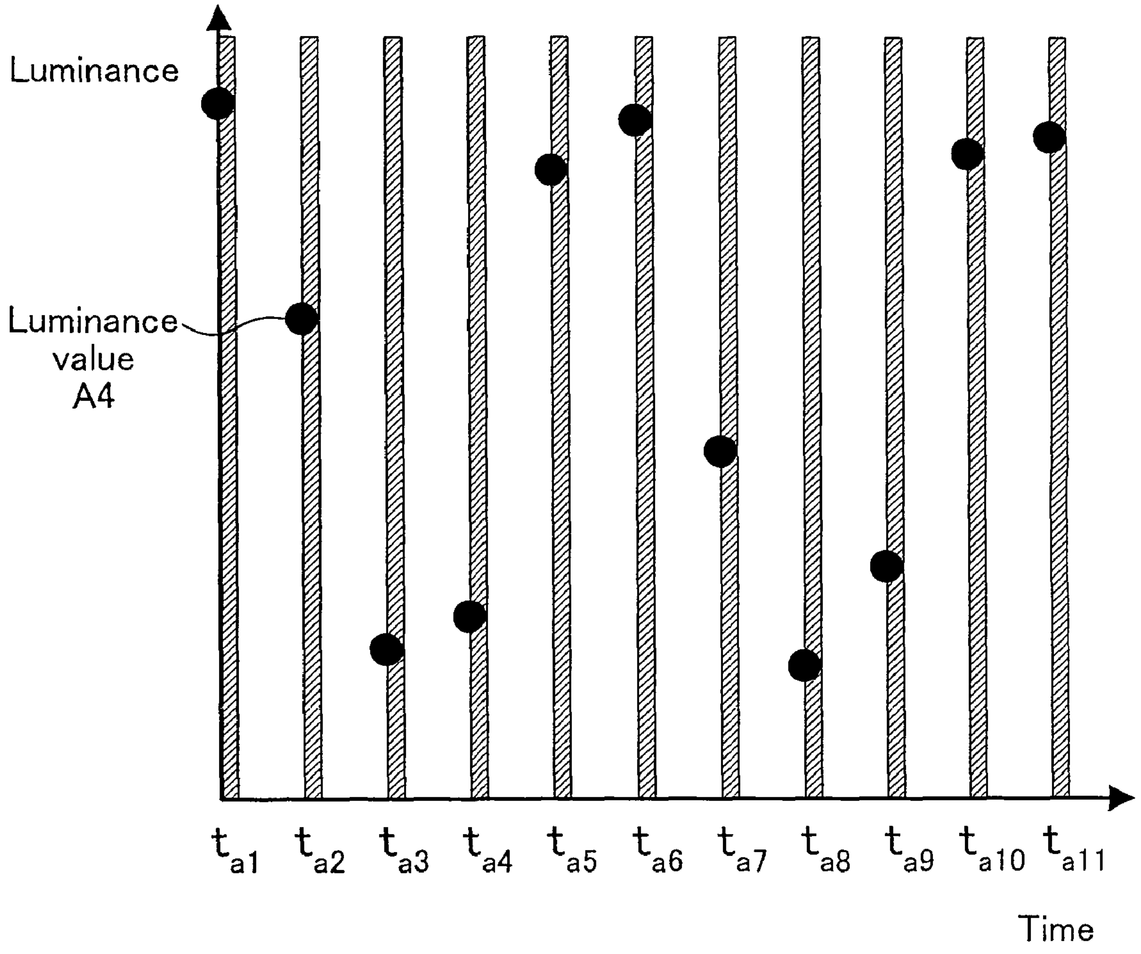
FIG. 4 is a diagram showing luminance values observed under the condition of FIG. 3.

FIG. 3 is a graph illustrating the occurrence of a flicker, showing a luminance variation A1 at a point on the object under fluorescent lamp lighting. The vertical axis represents the luminance, and the horizontal axis the time. A2 represents the imaging timing (time ta1 to time ta11), and A3 the exposure time. Then, the observed luminance value A4 varies over times as shown in FIG. 4. Specifically, the luminance value A4 of an actually captured image is obtained as the integration of the luminance variation A1 over the exposure time A3 at each of the imaging time ta1 to the imaging time ta11.

In view of this, it is possible to capture images through which the luminance varies over time by capturing images while setting the exposure time to be sufficiently short with respect to the luminance variation cycle of the light source. With an ordinary fluorescent lamp, the luminance varies with a cycle that is twice the AC frequency. Thus, since the blinking frequency of a fluorescent lamp is 100 Hz and 120 Hz in Eastern Japan and in Western Japan, respectively, the exposure time can be set to be sufficiently short with respect to 1/100 sec or 1/120 sec, e.g., 2 msec. Alternatively, the exposure time may be set to the fastest shutter speed of a camera, e.g., 1 msec.

Figure 5:
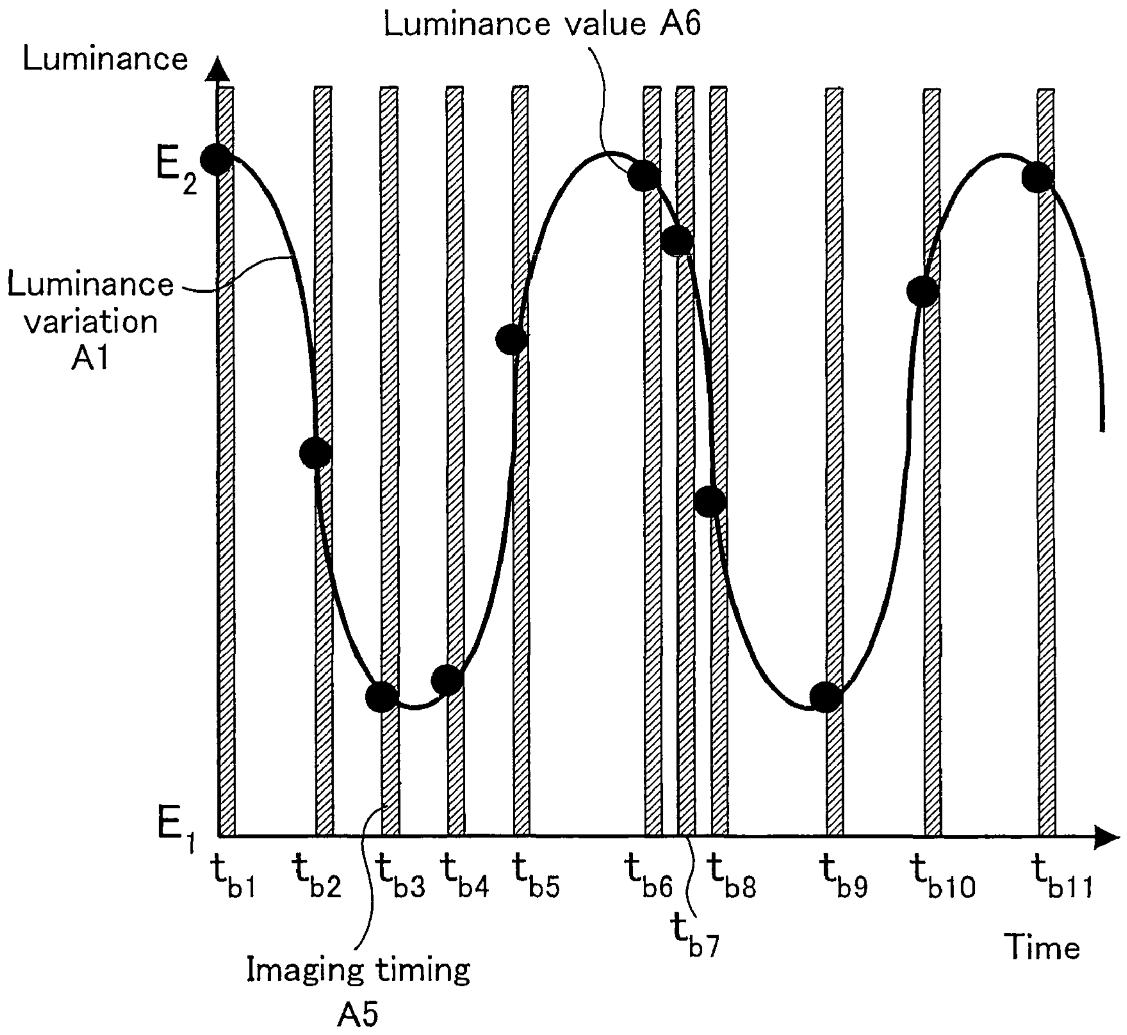
FIG. 5 is a diagram showing a case where the imaging timing is set to random under the condition of FIG. 3.

As shown in FIG. 5, it is preferred that an imaging timing A5 is set so that it does not coincide with the phase of the light source luminance variation A1, e.g., randomly (time tb1 to time tb11). This setting can be achieved by, for example, a program based on random number generation. As a result, a luminance value A6 is obtained.

While the description has been made with respect to a case where a fluorescent lamp is used as an example of the light source 11, it is understood that the light source 11 is not limited to a fluorescent lamp. For example, an LED or a display may be used as the light source 11.

LED lighting devices have been rapidly spreading in recent years for their brightness and their long lifetime. Even in a house, it has the potential of replacing the currently wide-spread fluorescent lamps. Recently, products such as "LED-based downlight" have been sold. Moreover, researches have been started for a technique for blinking an LED light source at such a high speed that it cannot be perceived by human eyes while transmitting data, i.e., so-called "visible light communications" (see, for example, Shinichiro Haruyama, "Visible Light Communication", Journal of the Institute of Electronics, Information and Communication Engineers, A, vol. J86-A, No. 12, pp. 1284-1291, 2003). Therefore, by setting the exposure time of the imaging device 20 to be shorter than the blinking cycle of an LED, it is possible to capture so-called "light source-varied images" through which the luminance varies over time. Therefore, the image processing method of the present embodiment can be realized as described above even if fluorescent lamp lighting devices, currently being the mainstream, are replaced by LED lighting devices in the future.

Moreover, some recent digital video cameras are equipped with technology called "0-lux color night view", where a liquid crystal monitor, which is normally used for displaying images, is used as a lighting panel. The process described above is very effective also where such a video camera is used.

The screen of an liquid crystal display or a CRT display connected to a personal computer is refreshed with a vertical sync frequency of about 60 Hz. In other words, the luminance of the screen varies with a cycle corresponding to the vertical sync frequency. Therefore, even when such a display is used as the light source 11, a plurality of images that are different from one another in terms of the light source conditions can be captured as described above.

A plasma display represents each gray level as a combination of a plurality of sub-field pixels of different luminance values (see, for example, Tsutomu Tokunaga, Hideto Nakamura, Masahiro Suzuki, Nobuhiko Saegusa, "Development of New Driving Method for AC-PDPs", PIONEER R&D, vol. 11, No. 1, pp. 17-23, 2003). Therefore, in principle, each pixel is switched between two values of ON and OFF. However, since the pixels are very small, a plasma display can be treated as a light source that includes a plurality of pixels arranged together. Therefore, even when a still image is being displayed, the luminance varies over time by varying the exposure timing. Therefore, even if the plasma display is used as the light source 11, a plurality of images that are different from one another in terms of the light source conditions can be captured as described above.

Referring back to FIG. 2, in step S12, the process detects a temporal luminance variation of each corresponding point through a plurality of images that are different from one another in terms of the light source conditions, which have been captured in step S11 by means of the imaging device 20. Where the position of the imaging device 20 is fixed, the image processing device 30 can detect luminance variations for each pixel through the plurality of captured images.

In the present embodiment, it is not necessary that the position of the imaging device 20 is fixed. For example, where the camera is moved around, the process may track feature points on the image to identify the corresponding points in a plurality of images so that the process can detect luminance variations at each of these corresponding points. Known methods for such feature point extraction and feature point tracking include, for example, the Harris operator and the KLT (Kanade-Lucas-Tomasi) Feature Tracker (see, for example, Jianbo Shi and Carlo Tomasi, "Good Features to Track", IEEE Conference on Computer Vision and Pattern Recognition, pp. 593-600, 1994).

Moreover, what is detected by the image processing device 30 in step S12 does not always have to be luminance variations on images. For example, the process may detect variations in color vector information such as the RGB values at each of the corresponding points on the image.

Then, in step S13, the process estimates the shadow area in the image by using information on the temporal luminance variation detected in step S12.

Where the light source is a single point light source and where no ambient light is present, the luminance value of the shadow area is zero. In such a case, the shadow area can be estimated through image segmentation using the luminance value as the threshold value. However, where there are a plurality of light sources, there are many areas where a shadow is formed as no light reaches there from one light source but the luminance value thereof does not become zero as some light reaches there from another light source. With such shadow areas, the estimation is very difficult by a method as described above that simply uses a threshold value.

Figure 6:
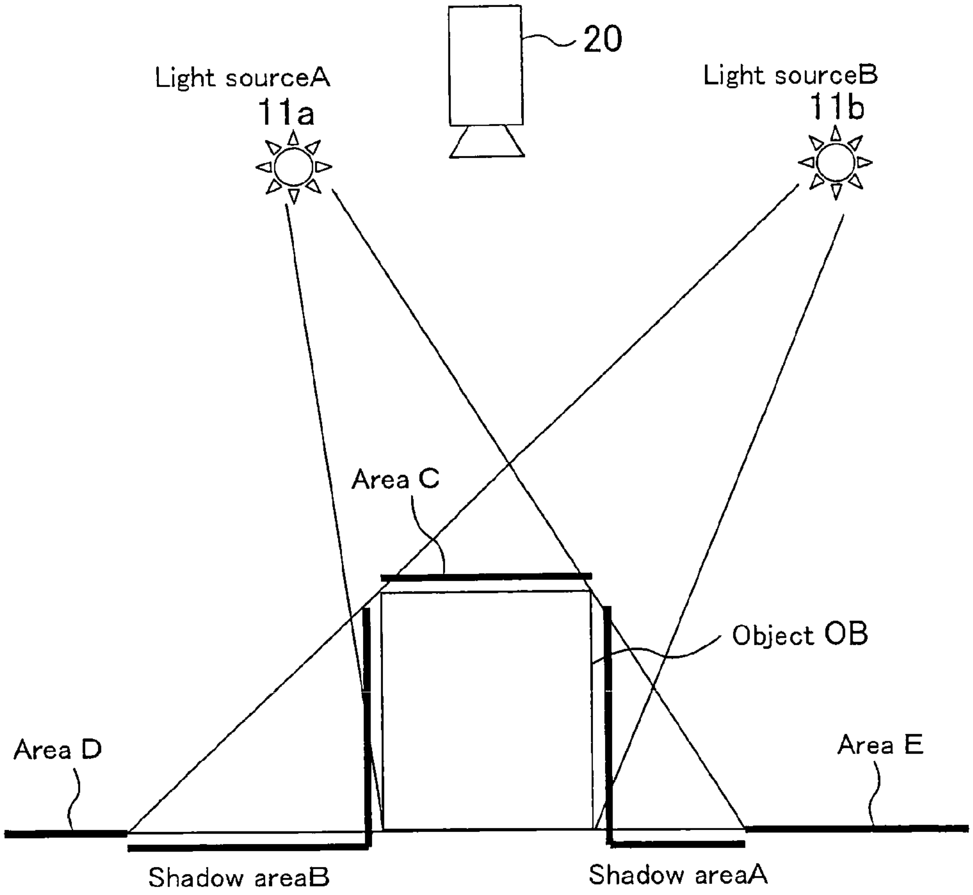
FIG. 6 is a diagram illustrating a behavior of shadows where there are a plurality of light sources.

FIG. 6 is a diagram showing shadow areas where there are a plurality of light sources. In FIG. 6, the object OB is illuminated by two light sources, i.e., a light source A 11*a* and a light source B 11*b*. The imaging device 20 is imaging the object OB from above. First, in the shadow area A, a shadow is formed because no light reaches there from the light source A 11*a*. If the light source A ha were the only light source to illuminate the object OB, the luminance value of the shadow area A would be zero, but in fact light from the light source B 11*b* reaches the area. In the shadow area B, if the light source B 11*b* were the only light source to illuminate the object OB, the luminance value of the shadow area B would be zero, but in fact light from the light source A 11*a* reaches the area. Thus, where two light sources, i.e., the light source A 11*a* and the light source B 11*b*, are lit, neither luminance value of the shadow area A nor that of the shadow area B becomes zero. Therefore, it is difficult to estimate the shadow area.

It is assumed herein that the light source A 11*a* and the light source B 11*b* are LED light sources, and are blinking with different frequencies from each other. Where ωA and ωB denote the angular frequency of blinking of the light source A 11*a* and that of the light source B 11*b*, respectively, the luminance values $I_A$ and $I_B$ are represented by the following expressions, respectively.

[Expression 1]

$$I_A = E_A \cos(\omega_A t) \quad \text{(Expression 1)}$$

$$I_B = E_B \cos(\omega_B t + \theta_B)$$

Herein, $E_A$ and $E_B$ denote amplitudes of luminance of the light source A 11*a* and the light source B 11*b*, respectively, t denotes time, and $\theta_B$ denotes the phase difference between the blinking of the light source A 11*a* and that of the light source B 11*b*. Assuming that there is no light source other than the light source A 11*a* and the light source B 11*b* in the imaging environment, the luminance value $I_p$ in a pixel p of the captured image varies over time as follows.

[Expression 2]

$$I_p=E_{pA}\cos(\omega_A t)+E_{pB}\cos(\omega_B t+\theta_B) \quad \text{(Expression 2)}$$

Herein, $E_{pA}$ and $E_{pB}$ are constants representing the degrees of contribution of the light source A 11*a* and the light source B 11*b*, respectively, in the pixel p, which are dependent on the normal direction of the pixel p, the angle of incidence of light from each light source, the distance from each light source to the object OB, $E_A$ and $E_B$, the reflectance, etc.

Then, performing an FFT (Fast Fourier Transform) on the time series data of luminance for each pixel detected in step S12 yields, based on (Expression 2), frequency components corresponding to the luminance variation of the light source A 11*a* and that of the light source B 11*b*. In FIG. 6, in an area where light from the two light sources, i.e., the light source A 11*a* and the light source B 11*b*, both reach (e.g., areas C, D and E), the two frequency components are both detected. In the shadow area A where a shadow is formed by the light source A 11*a*, $$E_{pA}=0$$

holds in (Expression 2), whereby only one of the frequency components is detected. Similarly, in the shadow area B where a shadow is formed by the light source B 11*b*, $$E_{pB}=0$$

holds in (Expression 2), whereby only one of the frequency components is detected. Thus, by performing a frequency analysis for each point of the image and counting the number of spectra detected, it is possible to estimate that an area is a shadow area of the image if the count for that area is low.

It is understood that the method for shadow area estimation of the present embodiment is also applicable to light sources other than those whose luminance varies continuously. For example, it can also be applied to a light source whose luminance varies discontinuously, e.g., one that is alternately turned ON and OFF.

In FIG. 6, it is assumed that the light source A 11*a* and the light source B lib are alternately turned ON and OFF. Then, assume that only the light source A ha is switched off after the light source A 11*a* and the light source B 11*b* are both being lit. Then, in the shadow area A where a shadow is formed by the light source A 11*a*, the luminance value does not vary when the light source A 11*a* is switched off because no light from the light source A 11*a* was reaching there in the first place. In contrast, in the shadow area B and in the areas C, D and E, the amount of incident light decreases as the light source A 11*a* is switched off, and therefore the luminance value thereof decreases. Where only the light source B 11*b* is switched off, the luminance value of the shadow area B where a shadow is formed by the light source B will not vary, but the luminance value will decrease in the shadow area A and in the areas C, D and E. Moreover, when the light source A 11*a* is lit, the luminance value in the shadow area A will not vary, but the luminance value will increase in the shadow area B and in the areas C, D and E. Thus, it is possible to estimate shadow areas based on the luminance variations in the image.

While the description has been made with respect to a case where there are two light sources, it is understood that there may be three or more light sources. Moreover, as described above, in order to utilize frequencies of different light sources, images may be captured in a state where two or more light source are lit at the same time. In such a case, light sources that repeatedly blink at the same timing may have the same frequency of luminance variations. This is important particularly for applications in a house. In a house, it is common that a plurality of lighting devices of the same model are installed. With a lighting device including a plurality of fluorescent lamps emitting light therefrom, these light sources can be considered as being a lighting device including light sources of different luminance variation phases blinking alternately, as will be described later. Thus, being able to perform similar processes on light sources that repeatedly blink with the same frequency means that the present embodiment can be applied to fluorescent lamp lighting devices, currently being the mainstream, with no installation cost, which is of very high utility value.

Then, in step S14, the image processing device 30 linearizes the image, for example, by using the results of the shadow area estimation obtained in step S13. The photometric linearization will now be described.

In order to recognize the position and the posture of an object or to detect the motion thereof, methods using cameras have been widely used. This is realized by performing an image processing method, such as pattern matching, optical flow detection and feature point extraction. Such an image processing technique is effective for images with no noise, but cannot realize sufficient reliability and precision for images captured under an ordinary environment such as in a house (see, for example, Atsuhiko Banno, Katsushi Ikeuchi, "Removing Specularities of Vehicles from Image Sequences by using Spacio-Temporal Images taken by a Moving Camera", Information Processing Society of Japan Technical Report, CVIM, 2003-CVIM-141, pp. 17-23, 2003). A primary reason for this is that while a normal image process assumes an object of only diffuse reflection, the color information and the edge information of image data substantially vary in practice depending on the camera position and the light source position due to the influence of specular reflection and shadows.

Therefore, before an image process, a pre-process is performed for correcting specular reflection and shadow areas. A photometric linearization is an image process method, in which a plurality of images captured while varying the position of the light source are used to synthesize linearized images each composed of only a diffuse reflection component without specular reflection or shadows (see, for example, Non-Patent Document 2). Moreover, an image segmentation based on optical characteristics is performed. The method will now be described in detail.

Figure 7:
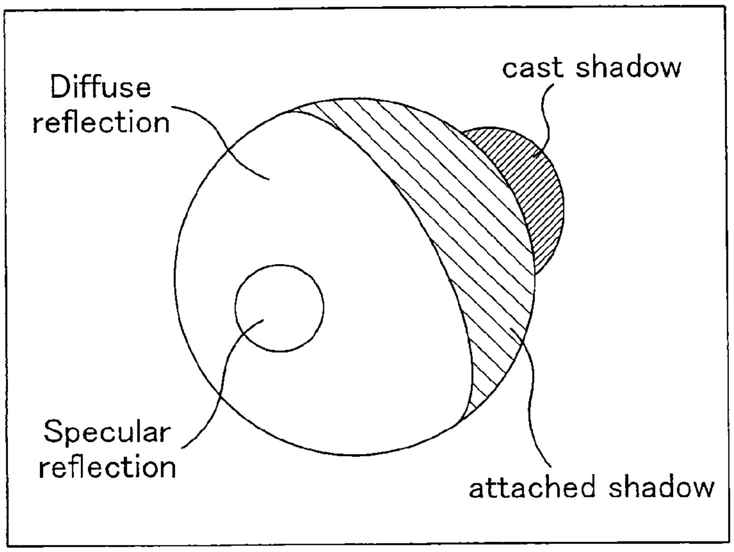
FIG. 7 is a conceptual diagram showing the relationship between diffuse reflection, specular reflection and shadows, which are optical phenomena.

FIG. 7 is a diagram showing the relationship diffuse reflection, specular reflection and shadows, which are optical phenomena. Assuming a "dichromatic reflection model", the luminance of an object is represented by the sum of a diffuse reflection component and a specular reflection component. In a Lambertian model, the luminance value $I_d$ of a diffuse reflection component is represented by the following expression.

[Expression 3]

$$I_d=n\cdot s \quad \text{(Expression 3)}$$

Figure 8:
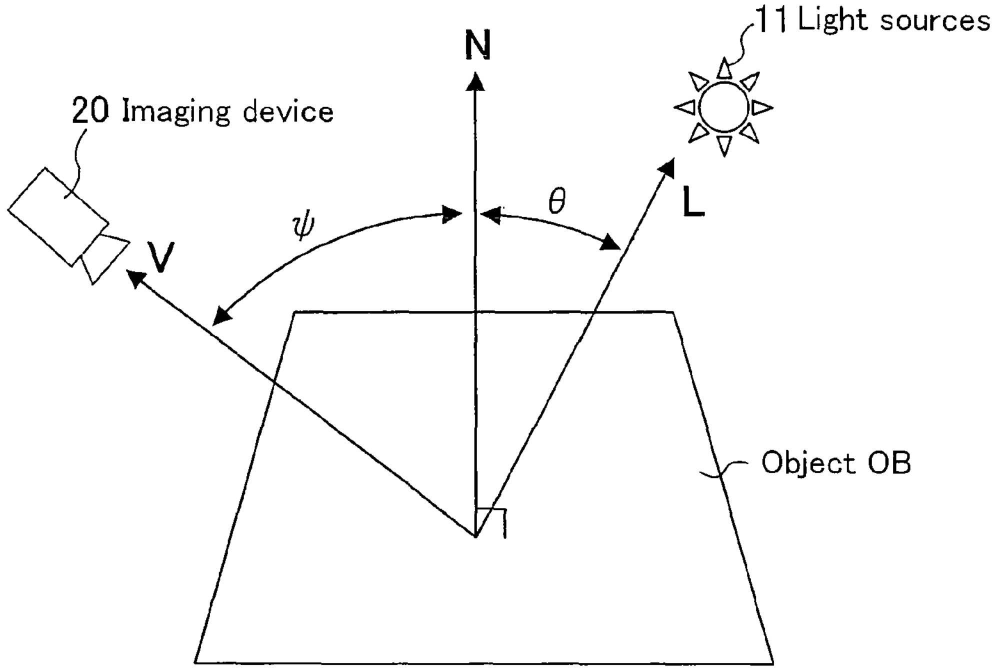
FIG. 8 is a conceptual diagram showing the relationship between the light source, the imaging device and the object normal direction.

Herein, n is the product between the object surface normal direction vector N and the diffuse reflectance (albedo), and s represents the product between the light source-direction unit vector L and the light source illuminance (FIG. 8).

As shown in FIG. 7, shadows are classified into two: attached shadows that are formed because the object normal direction is not facing the light source; and cast shadows that are formed because light is blocked by other objects. If there is no influence of environmental light or interreflection, attached shwdow and cast shadow have a luminance of zero. However, in (Expression 3), an attached shadow has a negative value, and a cast shadow has a positive value.

Shashua has shown that an image of an arbitrary light source direction can be represented through linear combination of three images of different light source directions by assuming a directional light source and a perfect diffuse reflection plane (Shashua A., "Geometry and Photometry in 3D Visual Recognition", P. D. thesis, Dept. Brain and Cognitive Science, MIT, 1992). Where $I_1$, $I_2$ and $I_3$ are vector representations of three images of different light source directions, an image $I_k$ of an arbitrary direction can be represented through linear combination as shown in the following expression.

[Expression 4]

$$I_k = c_k^1 I_1 + c_k^2 I_2 + c_k^3 I_3 \qquad \text{(Expression 4)}$$

Herein, $$c_k = [c_k^1 c_k^2 c_k^3]^T \qquad \text{[Expression 4A]}$$

is referred to as a linearization coefficient set for the image $I_k$. An image produced by a linear sum as described above is referred to as a linearized image. The linearized image is a synthetic image of only a diffuse reflection component, satisfying the Lambertian model. However, a real image includes shadows and light source reflection, and therefore does not satisfy (Expression 4). In view of this, Non-Patent Document 2 captures a plurality of images of different light source directions and uses RANSAC (see M. A. Fischler and R. C. Bolles, "Random Sample Consensus: A Paradigm for Model Fitting with Applications to Image Analysis and Automated Cartography", Communications of the ACM, Volume 24, Issue 6, pp. 381-395) to thereby produce three images each being an image of only a diffuse reflection component satisfying (Expression 4). An image of only a diffuse reflection component produced as described above is referred to as a "base image". By applying the base image to the method of Shashua, it is possible to produce linearized images corresponding to the light source conditions of the captured images. Thus, linearized images are represented by the following expression.

[Expression 5]

$$I_k^L = c_k^1 I_1^B + c_k^2 I_2^B + c_k^3 I_3^B \qquad \text{(Expression 5)}$$

Herein, $I_k^L$ is a linearized image for an input image k, and $I_1^B$, $I_2^B$ and $I_3^B$ are three base images produced by a method as described above. A linearized image produced as described above is an ideal image with no specular reflection. Therefore, by performing an image process using such linearized images, it is possible to realize an image process that is not influenced by specular reflection or shadows.

Figure 9:
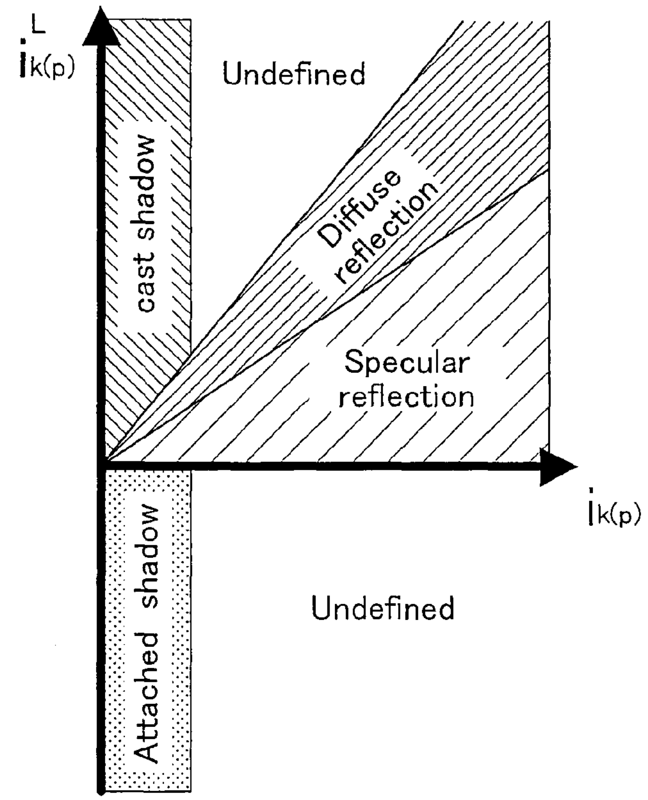
FIG. 9 is a graph showing the standard for an image segmentation based on optical characteristics

In step S14, an image segmentation based on optical characteristics may be performed by using linearized images obtained as described above. Where $i_{k(p)}$ is the luminance value of the pixel p in the input image k, and $i_{k(p)}^L$ is that of the corresponding linearized image, the diffuse reflection, the specular reflection, the cast shadow and the attached shadow can be classified as shown in FIG. 9 according to the following relational expression. T and Ts are threshold values.

[Expression 6]

$$\begin{cases} \text{diffuse reflection} & \text{if } |i_{k(p)} - i_{k(p)}^L| \le T \cdot i_{k(p)} \\ \text{specular reflection} & \text{if } (i_{k(p)} - i_{k(p)}^L > T \cdot i_{k(p)}) \cap (i_{k(p)}^L \ge 0) \\ \text{cast shadow} & \text{if } (i_{k(p)} - i_{k(p)}^L < -T \cdot i_{k(p)}) \cap (i_{k(p)} < Ts) \\ \text{attached shadow} & \text{if } (i_{k(p)}^L < 0) \cap (i_{k(p)} < Ts) \end{cases} \qquad \text{(Expression 6)}$$

Since (Expression 6) assumes a single light source, cast shadow areas and attached shadow areas are classified as shadows based on the threshold value Ts. However, in an environment such as in an ordinary living space where there are a plurality of light sources, such classification of shadow areas based on a threshold value is very difficult. With the image processing method of the present embodiment, shadow areas have already been estimated by a method described above, the diffuse reflection, the specular reflection, the cast shadow and the attached shadow can be classified according to the following relational expression.

[Expression 7]

$$\begin{cases} \text{diffuse reflection} & \text{if } |i_{k(p)} - i_{k(p)}^L| \le T \cdot i_{k(p)} \\ \text{specular reflection} & \text{if } (i_{k(p)} - i_{k(p)}^L > T \cdot i_{k(p)}) \cap (i_{k(p)}^L \ge 0) \\ \text{cast shadow} & \text{if } (i_{k(p)} - i_{k(p)}^L < -T \cdot i_{k(p)}) \cap (i_{k(p)} \in Shdw) \\ \text{attached shadow} & \text{if } (i_{k(p)}^L < 0) \cap (i_{k(p)} \in Shdw) \end{cases} \qquad \text{(Expression 7)}$$

Herein, $$i_{k(p)} \in Shdw \qquad \text{[Expression 7A]}$$

indicates that the pixel p in the $k^{th}$ image has been estimated as being a shadow area in the shadow area estimation step S13. Thus, according to the present embodiment, it is possible to perform an image process based on optical characteristics under an ordinary living environment, which has been difficult with conventional photometric linearization.

Figure 36:
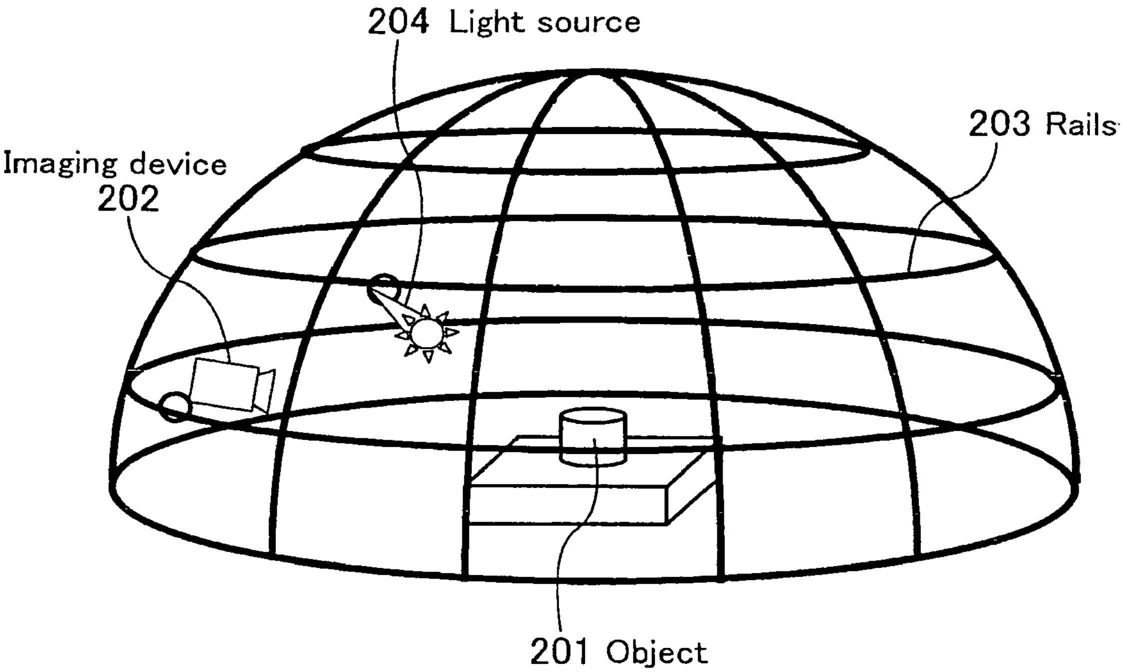
FIG. 36 is a diagram showing a configuration of a conventional imaging system for capturing images through which the luminance or the position of the light source varies.
Figure 37:
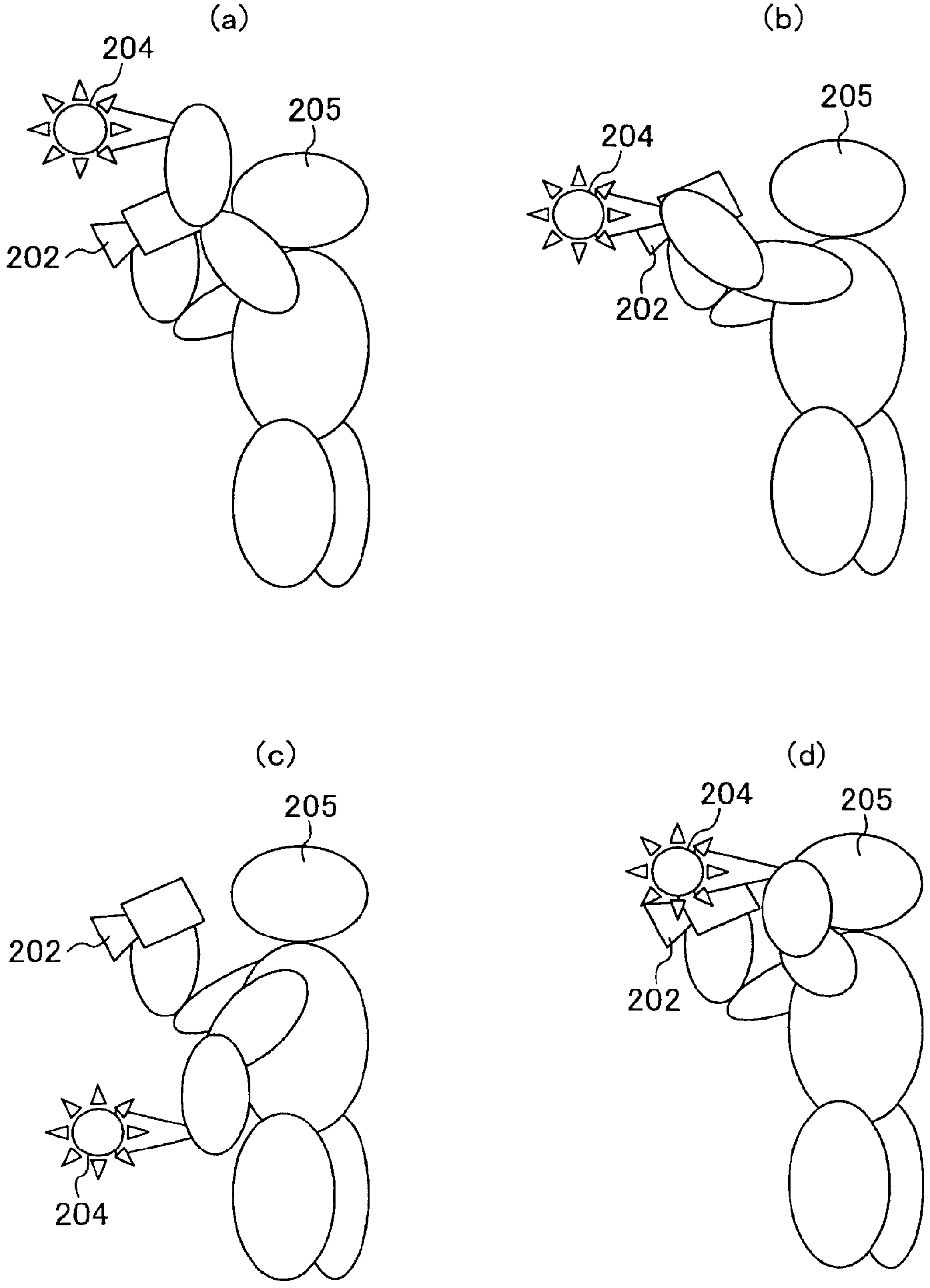
FIG. 37 is a diagram showing a conventional imaging method for capturing images through which the luminance or the position of the light source varies.

As described above, in order to obtain a plurality of images that are different from one another in terms of the light source conditions (light source-varied image) with conventional methods, it is necessary to use a very large-scale imaging system as shown in FIG. 36 or to perform a complicated operation as shown in FIG. 37. In contrast, in the present embodiment, it is possible to obtain light source-varied images with a very simple configuration by using a light source whose luminance varies. This will now be described with respect to a case where a lighting device including three fluorescent lamps is used.

Figure 10:
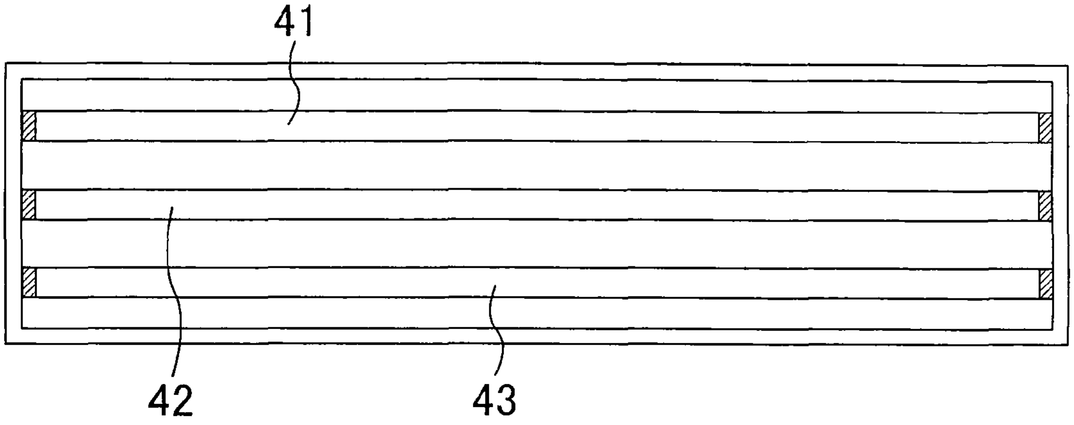
FIG. 10 is a diagram illustrating a light-emitting pattern of a fluorescent lamp.
Figure 10:
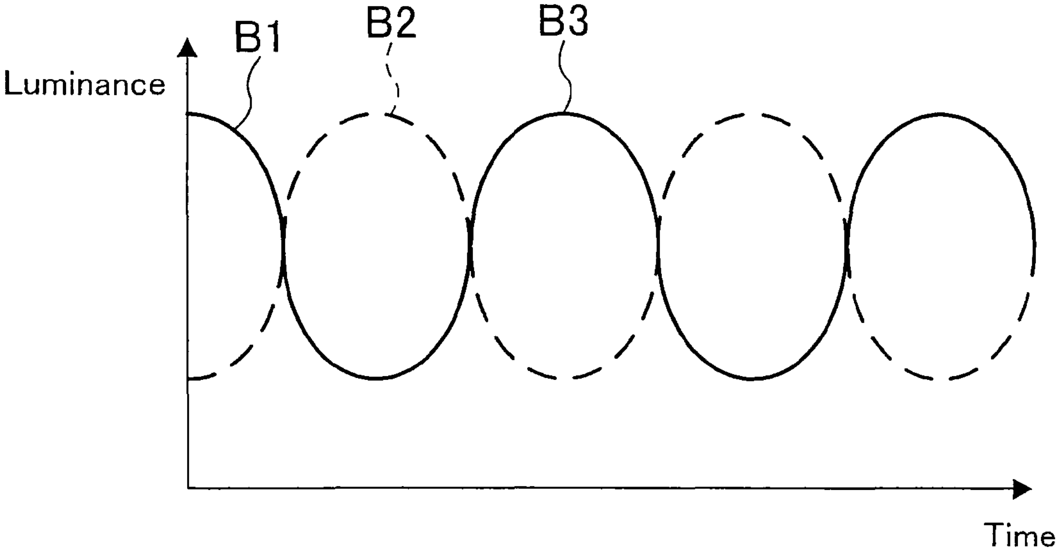

Assume that an object is illuminated by a lighting device including three fluorescent lamps 41, 42 and 43, schematically shown in FIG. 10(*a*). In many of those lighting devices including a plurality of fluorescent lamps therein, the phase of light emitting timing is shifted from one fluorescent lamp to another in order to suppress the flickering of fluorescent lamps. FIG. 10(*b*) is a graph schematically showing the luminance variation of the fluorescent lamps 41 to 43 in a lighting device of FIG. 10(*a*). In FIG. 10(*b*), B1, B2 and B3 denote luminance variations of the fluorescent lamps 41, 42 and 43, respectively, of FIG. 10(*a*).

Figure 11:
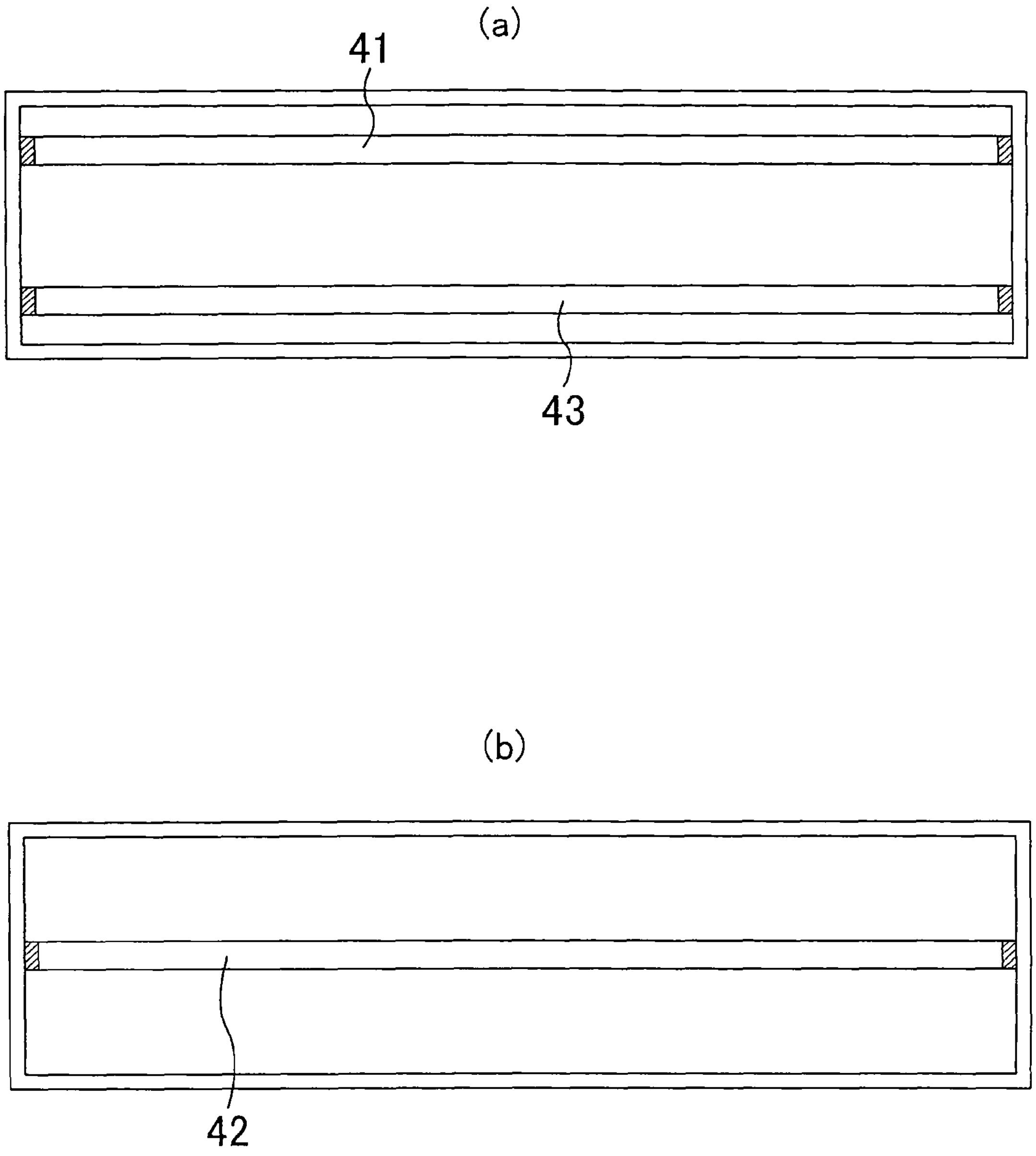
FIG. 11 is a diagram illustrating a light-emitting pattern of a fluorescent lamp.

It can be seen from FIG. 10(*b*) that the outer two fluorescent lamps 41 and 43 repeatedly blink in phase with each other, whereas the central fluorescent lamp 42 repeatedly blinks in opposite phase. Thus, the lighting device of FIG. 10(*a*) can be simulatively considered to be two different light sources, as shown in FIG. 11(*a*) and FIG. 11(*b*), whose light emitting positions are different from each other and which blink alternately. Therefore, by a method as described above, it is possible to easily capture a plurality of images that are different from one another in terms of the light source conditions.

Therefore, it is possible to realize, with low cost, a photometric linearization when using a lighting device including a plurality of fluorescent lamps therein.

Figure 12:
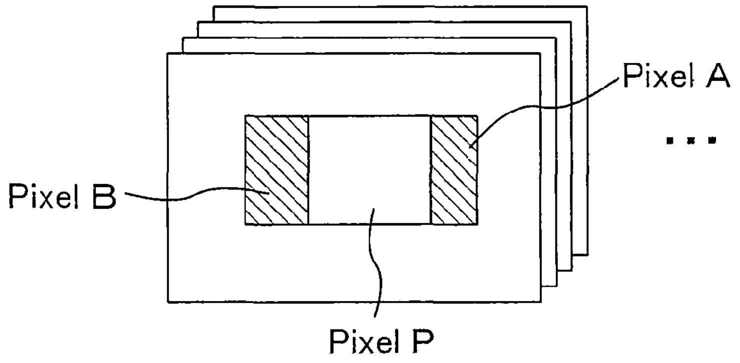
FIG. 12 is a diagram showing an example of image process results obtained in the first embodiment of the present invention.
Figure 12:
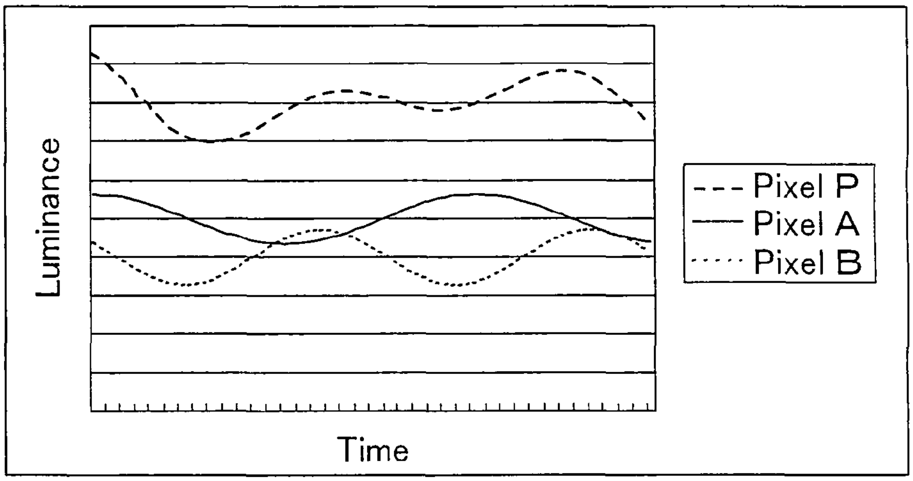
Figure 12:
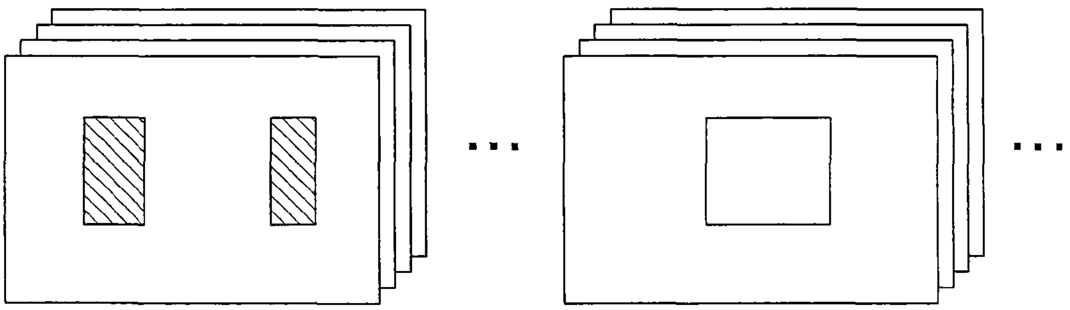
Figure 13:
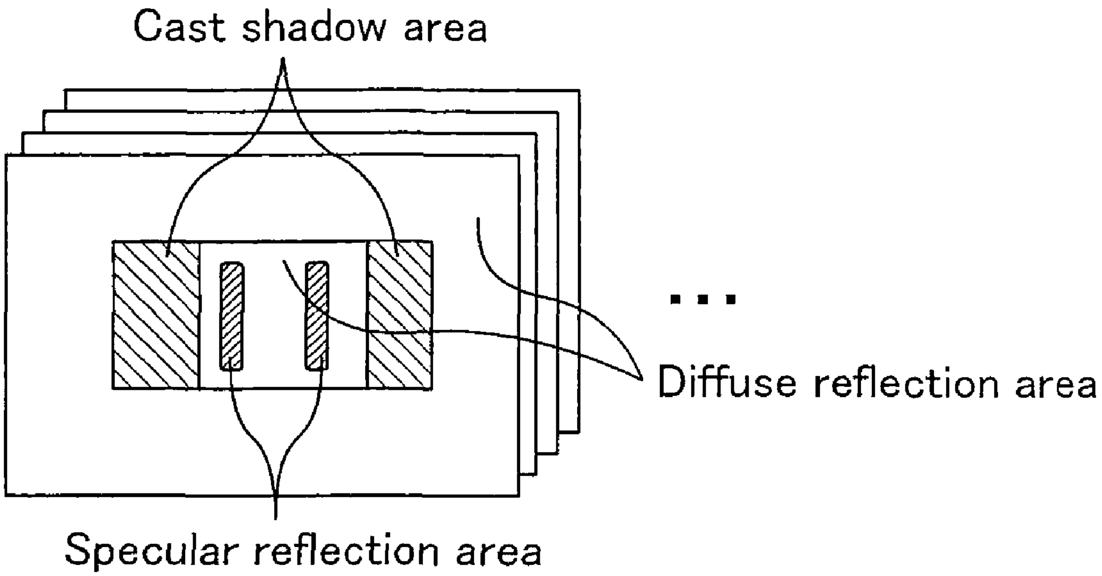
FIG. 13 shows an example of an image segmentation based on optical characteristics, obtained based on the results of FIG. 12.

FIG. 12 is a diagram showing an example of image process results obtained in the present embodiment. In the figure, FIG. 12(*a*) shows input images obtained by imaging the object OB with a configuration of FIG. 6, and FIG. 12(*b*) is a graph showing the temporal luminance variations of pixels A and B in shadow areas and a pixel P in a diffuse reflection area. A frequency analysis such as an FFT (Fast Fourier Transform) on the temporal luminance variations shows that the temporal luminance variation of the pixel A or that of the pixel B only includes a single frequency, but the temporal luminance variation of the pixel P includes a plurality of frequencies combined together. From this, it can be estimated that the pixels A and B are shadow areas but the pixel P is not a shadow area. By performing this operation on all pixels, shadow areas as shown in FIG. 12(*c*) are estimated. By using the estimation results and the relational expression of (Expression 7), it is possible to synthesize linearized images as shown in FIG. 12(*d*). By using the results of FIG. 12, it is also possible to perform an image segmentation based on optical characteristics as shown in FIG. 13.

Moreover, the image processing method of the present embodiment is also effective in estimating the shape of the object OB by means of the image processing device 30. This will now be described with respect to an example of a method, which uses photometric stereo.

Photometric stereo is a method for estimating the object normal direction and the reflectance thereof by using three or more light source-varied images captured from different light source directions. For example, H. Hayakawa, "Photometric Stereo under a light source with arbitrary motion", Journal of the Optical Society of America A, vol. 11, pp. 3079-89, 1994 describes a method where six or more points of an equal reflectance are obtained from an image as known information and they are used as constraints, thereby estimating the following parameters even if the light source position information is unknown:

- the shape information and the optical information of the object: the normal direction and the reflectance at each point of the image; and
- the light source information: the light source direction and the illuminance.

It is known that this method is generally only applicable with an object of only diffuse reflection components, but accurate estimate values cannot be obtained with an object where there are shadows and specular reflection components. Therefore, if a photometric linearization process as described above is performed as a pre-process to synthesize linearized images each composed of only diffuse reflection components without shadows and specular reflection components, and then the photometric stereo is performed, it is believed that accurate estimate values are obtained. A method of performing a process, which is obtained by combining together a photometric linearization process and the photometric stereo, to estimate the parameters above will now be described.

Figure 14:
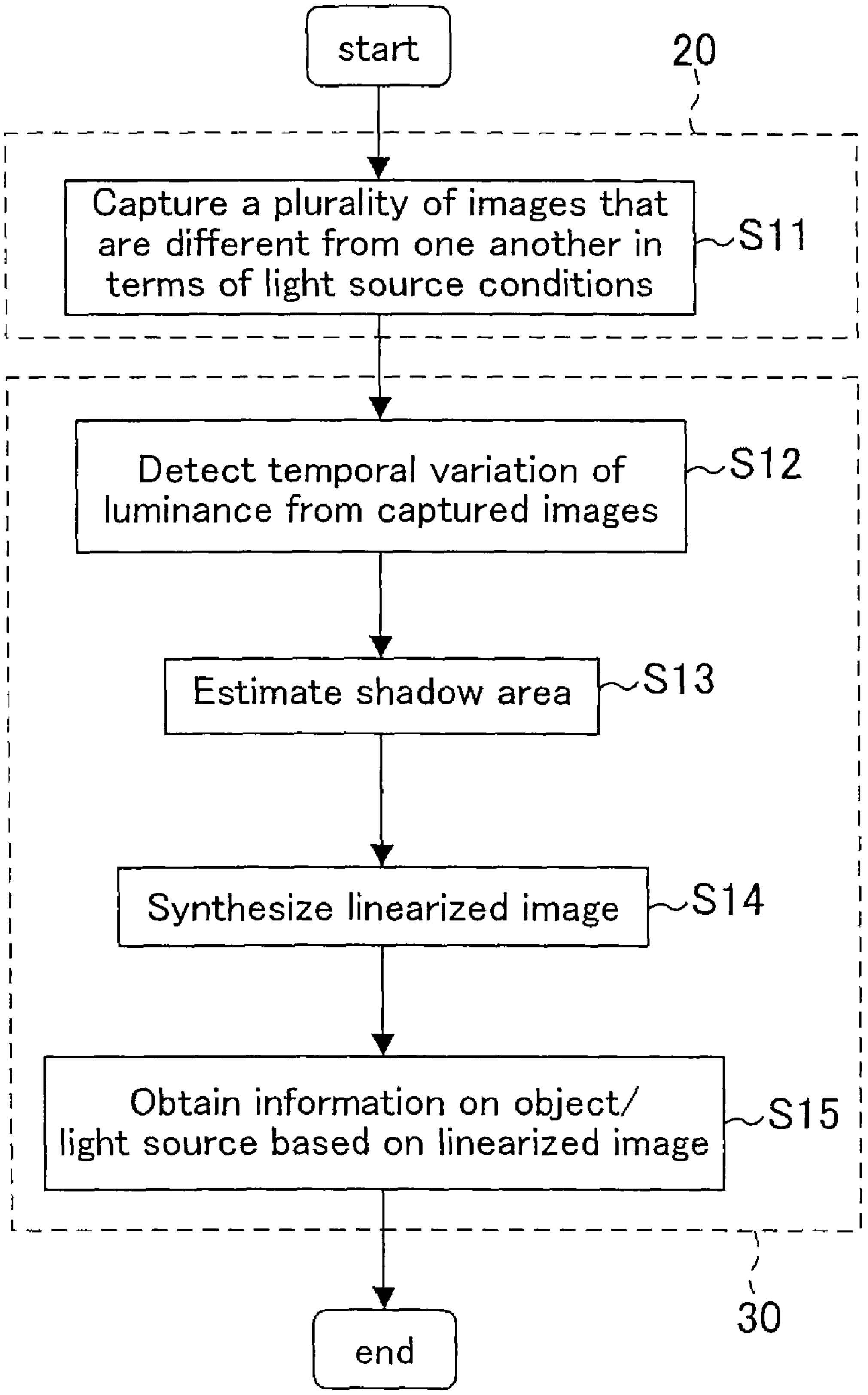
FIG. 14 is a flow chart showing another example of processes of the image processing method according to the first embodiment of the present invention.

FIG. 14 is a flow chart showing another example of processes of the image processing method according to the present embodiment. In FIG. 14, like steps to those of the flow chart of FIG. 2 are denoted by like reference numerals and will not be further described below. Steps S12 to S15 correspond to the image processing step.

First, the process obtains light source-varied images, and synthesizes linearized images by, a method described above (steps S11 to S14). Then, the process obtains information of the object and the light source by using the synthesized linearized images (step S15). This process will now be described in detail.

Linearized images synthesized from light source-varied images are represented by a luminance matrix I as shown in the following expression.

[Expression 8]

$$I = \begin{bmatrix} i^l_{1(1)} & \cdots & i^l_{f(1)} \\ \vdots & \ddots & \vdots \\ i^l_{1(p)} & \cdots & i^l_{f(p)} \end{bmatrix} \quad \text{(Expression 8)}$$

Herein, $i^1_{m(n)}$ represents the luminance value of a pixel n of a linearized image for the $m^{th}$ input image. The size of the image is p pixels, and the number of images captured is f.

Now consider a photometric linearization process. Based on (Expression 5) and (Expression 8), the following relationship is obtained.

[Expression 9]

$$I = B \cdot C \quad \text{(Expression 9)}$$

$$B = [\, I_1^B \;\; I_2^B \;\; I_3^B \,] = \begin{bmatrix} i^B_{1(1)} & i^B_{2(1)} & i^B_{3(1)} \\ \vdots & \vdots & \vdots \\ i^B_{1(p)} & i^B_{2(p)} & i^B_{3(p)} \end{bmatrix} = [\, b_1 \;\; b_2 \;\; \cdots \;\; b_p \,]^T$$

$$C = [\, c_1 \;\; \cdots \;\; c_p \,] = \begin{bmatrix} c_1^1 & \cdots & c_p^1 \\ c_1^2 & \cdots & c_p^2 \\ c_1^3 & \cdots & c_p^3 \end{bmatrix}$$

Based on (Expression 3), (Expression 8) is expressed as follows.

[Expression 10]

$$I = R \cdot N \cdot M \cdot T = S \cdot L \quad \text{(Expression 10)}$$

$$R = \begin{bmatrix} r_1 & & 0 \\ & \ddots & \\ 0 & & r_p \end{bmatrix}$$

$$N = [\, n_1 \;\; \cdots \;\; n_p \,]^T = \begin{bmatrix} n_{1x} & n_{1y} & n_{1z} \\ \vdots & \vdots & \vdots \\ n_{px} & n_{py} & n_{pz} \end{bmatrix}$$

$$M = [\, m_1 \;\; \cdots \;\; m_f \,] = \begin{bmatrix} m_{x1} & \cdots & m_{1xf} \\ m_{y1} & \cdots & m_{1yf} \\ m_{z1} & \cdots & m_{1zf} \end{bmatrix}$$

$$T = \begin{bmatrix} t_1 & & 0 \\ & \ddots & \\ 0 & & t_f \end{bmatrix}$$

$$S = [\, s_1 \;\; \cdots \;\; s_p \,]^T = \begin{bmatrix} s_{1x} & s_{1y} & s_{1z} \\ \vdots & \vdots & \vdots \\ s_{px} & s_{py} & s_{pz} \end{bmatrix} = R \cdot N$$

$$L = [\, l_1 \;\; \cdots \;\; l_f \,] = \begin{bmatrix} l_{x1} & \cdots & l_{1xf} \\ l_{y1} & \cdots & l_{1yf} \\ l_{z1} & \cdots & l_{1zf} \end{bmatrix} = M \cdot T$$

Herein, R, N, M, T, S and L represent the surface reflection matrix, the surface normal matrix, the light source-direction matrix, the light source luminance matrix, the surface matrix and the light source matrix, respectively. Moreover, r and n represent the surface reflectance and the surface normal, respectively, and t and m represent the light source luminance and the light source-direction unit vector, respectively.

Based on (Expression 9) and (Expression 10), the following relationships hold.

[Expression 11]

$$S=B\cdot A \quad \text{(Expression 11)}$$

[Expression 12]

$$L=A^{-1}\cdot C \quad \text{(Expression 12)}$$

Herein, A is a 3×3 matrix. Thus, by estimating the matrix A, a process similar to photometric stereo can be performed. Now consider estimating the matrix A.

From (Expression 10), each element of the matrix S represents the product between the surface reflectance and the surface normal at a corresponding point on the screen. Thus, each element of the matrix S squared represents the surface reflectance of a corresponding point on the screen squared.

Assuming that the pixels k (k=1, . . . , p') have an equal reflectance, the reflectance can be considered to be relatively 1, whereby the following relationship holds.

[Expression 13]

$$(A^T b_k)^2=b_k^T A A^T b_k=1 \quad k=1, \ldots, p' \quad \text{(Expression 13)}$$

Herein, if

[Expression 14]

$$AA^T=D \quad \text{(Expression 14)}$$

then,

[Expression 15]

$$b_k^T D b_k=1 \quad \text{(Expression 15)}$$

holds, whereby (Expression 13) can be solved by estimating the matrix D of (Expression 15).

From (Expression 14), based on the fact that the matrix D is a symmetric matrix, the number of constraint expressions that are necessary for uniquely solving (Expression 15), i.e., the number p' of points known to have an equal reflectance, is six at minimum. (Expression 14) can be solved easily by performing a singular value decomposition.

It is seen from the above that by capturing a plurality of images of an object of which six or more points are known to have an equal reflectance by using a light source with many-valued luminance variations, e.g., a fluorescent lamp, and by performing a photometric linearization process using the plurality of images, it is possible to decompose (Expression 10) and to thereby obtain the following information:

- the image segmentation based on optical characteristics (diffuse reflection, specular reflection, attached shadow, cast shadow);
- the shape information and the optical information of the object: the normal direction and the reflectance at each point of the image; and
- the light source information: the light source direction and the illuminance.

Figure 15:
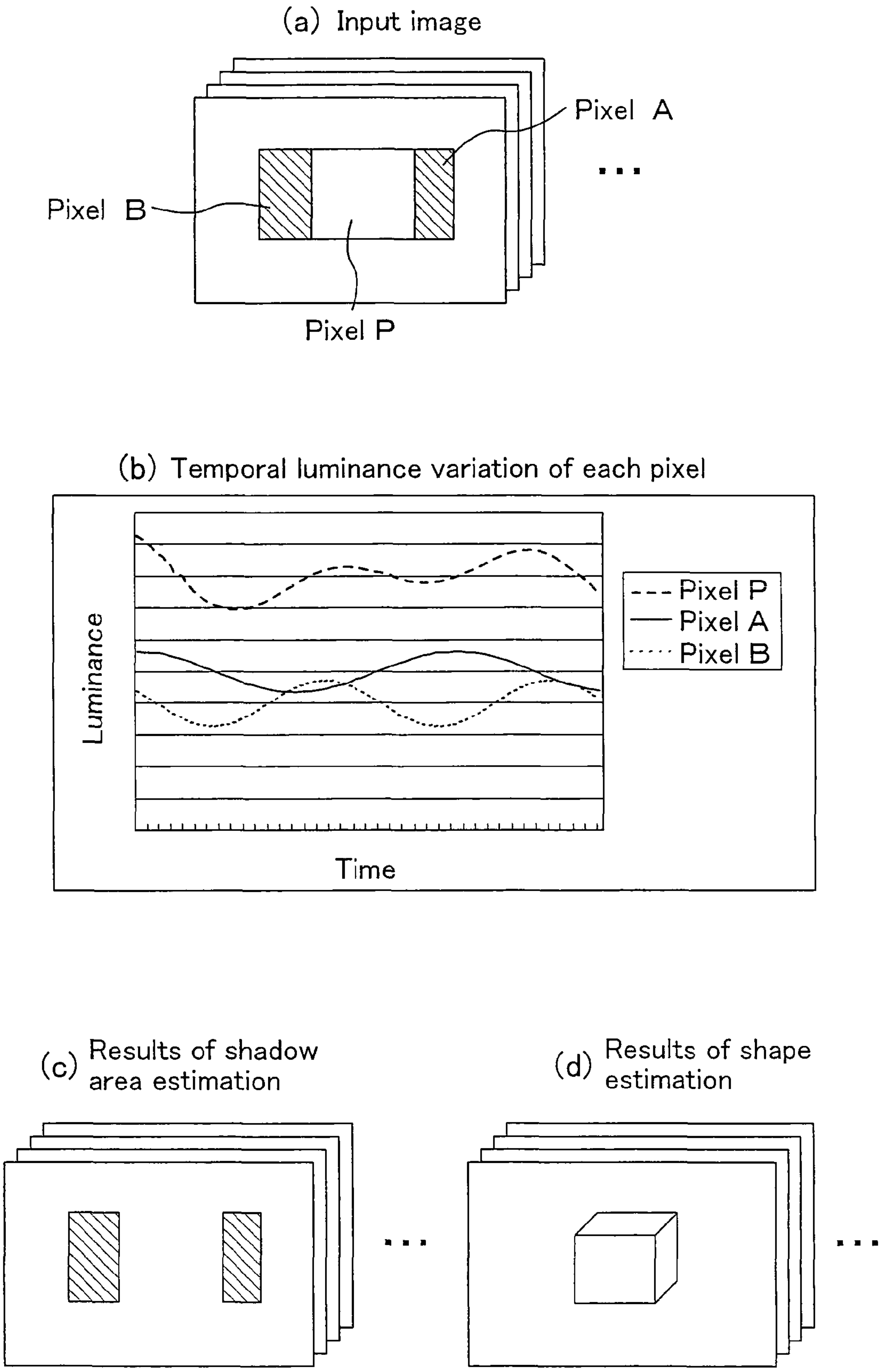
FIG. 15 is a diagram showing an example of image process results obtained in the first embodiment of the present invention.

FIG. 15 is a diagram showing an example of image process results obtained in the present embodiment. In the figure, FIGS. 15(*a*), 15(*b*) and 15(*c*) are like figures to those of FIG. 12, and will not be further described below. By using the shadow area estimation results as shown in FIG. 15(*c*) and the method as described above, it is possible to estimate the shape of the object OB as shown in FIG. 15(*d*). It is of course possible to estimate the reflectance, the light source direction, the illuminance, etc., of the object, but these are not shown in the figures.

As described above, according to the present embodiment, a plurality of images that are different from one another in terms of the light source conditions can be easily obtained under a light source whose luminance varies over time even under an ordinary living environment. Then, by using the images, it is possible to estimate shadow areas, and to produce linearized images, to perform an image segmentation based on optical characteristics, to estimate the shape of the object, to obtain light source information, etc.

Second Embodiment

Figure 16:
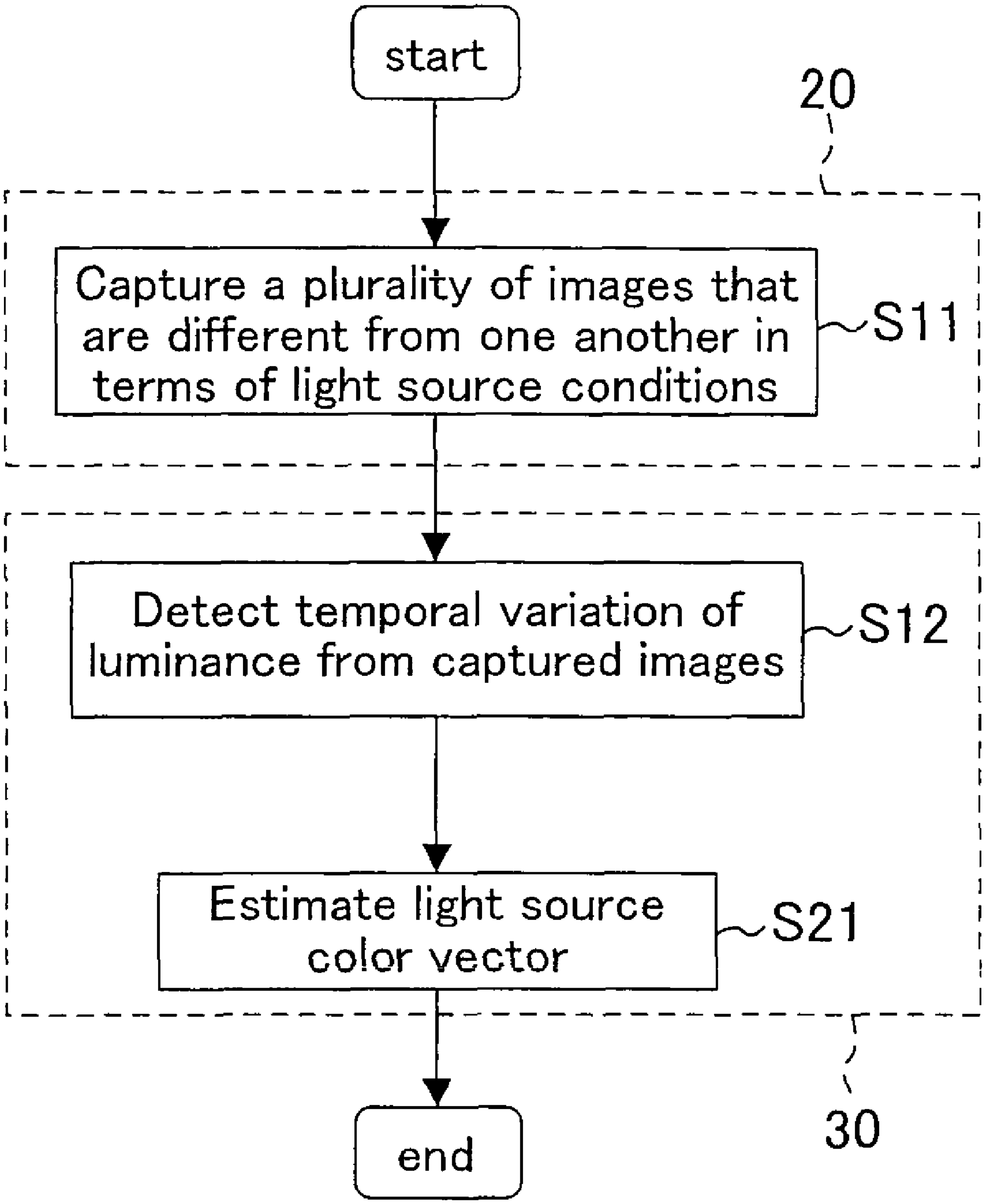
FIG. 16 is a flow chart showing processes of an image processing method according to a second embodiment of the present invention.

FIG. 16 is a flow chart showing processes of an image processing method according to a second embodiment of the present invention. In FIG. 16, like steps to those of the image processing method of the first embodiment shown in FIG. 2 are denoted by like reference numerals and will not be further described below. Steps S12 and S21 correspond to the image processing step. Moreover, the configuration of the present embodiment is similar to that of the first embodiment shown in FIG. 1, and will not be described below.

In the present embodiment, the shadow area estimation step S13 is not performed, and a process of estimating a light source color vector (step S21) is performed instead of step S14. The description will be made with respect to an example where the light source color vector is estimated by using a dichromatic reflection model.

With respect to recent researches on computer vision, advanced researches have been made on image processes taking into consideration not only geometric characteristics such as shape, but also physical laws of light. Among others, it is important to estimate the light source color vector at the time of capturing the image. This is effective when, for example, displaying how the appearance of an object varies under various light source environments in a digital archive, for example.

Herein, a method will be described in detail, in which an RGB color camera is used as the imaging device 20 to estimate a light source color vector based on the blinking of a fluorescent lamp.

Assuming a dichromatic reflection model, the luminance of an object is represented by the sum of a diffuse reflection component and a specular reflection component. Therefore, the color vector $S_p$ of the pixel p on the image is represented as shown in (Expression 16) as the sum of the diffuse reflection component color vector $S^d_p$ and the specular reflection component color vector $S^S_p$.

[Expression 16]

$$S_p=S^d_p+S^S_p \quad \text{(Expression 16)}$$

Since the specular reflection is considered to be the reflection of the incident light on the object surface, the specular reflection component color vector $S_p^s$ can be considered as being identical to the light source color vector SL or an attenuated version thereof. Moreover, the diffuse reflection component color vector $S^d_p$ is a color vector produced through internal reflection, and is therefore dependent on the intrinsic color vector $SP^d_p$ of the object. Thus, (Expression 16) can be rearranged as follows.

[Expression 17]

$$S_p = m_S(\theta,\phi)SL + m_d(\theta)SP^d_p \quad \text{(Expression 17)}$$

Herein, $m_S(\theta,\phi)$ and $m_d(\theta)$ are the weight of the specular reflection component and that of the diffuse reflection component, and θ and φ represent the angle between the normal direction vector N and the light source-direction unit vector L of the object, and the angle between the normal direction vector N and the imaging-direction unit vector V of the object, respectively, as shown in FIG. 8.

Now, consider using a lighting device including a plurality of fluorescent lamps therein as shown in FIG. 10. As described above, by using such a light source, it is possible to easily capture images that are different from one another in terms of the light source conditions.

Moreover, with fluorescent lamps, the light source color vectors thereof are all considered to be the same. Therefore, the color vector $S_p(t)$ at time t of the pixel p being illuminated by the lighting device is represented by the following expression.

[Expression 18]

$$\begin{aligned} S_p(t) &= S^1_p(t) + S^2_p(t) + S^3_p(t) \quad \text{(Expression 18)} \\ &= (m_{s1}(\theta_1, \varphi, t)SL + m_{d1}(\theta_1, t)SP^d_p) + \\ &\quad (m_{s2}(\theta_2, \varphi, t)SL + m_{d2}(\theta_2, t)SP^d_p) + \\ &\quad (m_{s3}(\theta_3, \varphi, t)SL + m_{d3}(\theta_3, t)SP^d_p) \\ &= (m_{s1}(\theta_1, \varphi, t) + m_{s2}(\theta_2, \varphi, t) + m_{s3}(\theta_3, \varphi, t)) \\ &\quad SL + (m_{d1}(\theta_1, t) + m_{d2}(\theta_2, t) + \\ &\quad m_{d3}(\theta_3, t))SP^d_p \end{aligned}$$

Herein, $S^1_p(t)$, $S^2_p(t)$ and $S^3_p(t)$ represent the color vectors at time t of the pixel p by the respective light sources (the fluorescent lamps 41, 42 and 43), $m_{si}(\theta,\Psi,t)$ and $m_{di}(\theta,\Psi,t)$ represent the weight of the specular reflection component and that of the diffuse reflection component, respectively, which indicate the mixing ratio therebetween. Observed values are herein functions of time t because the luminance of the light source varies over time t due to the blinking of the light source. Note however that this temporal variation only changes the scalar of the color vector.

Herein, based on the fact that $m_{si}(\theta,\Psi,t)$ and $m_{di}(\theta,\Psi,t)$ are scalar quantities, it can be seen that the color vector $S_p(t)$ represented by (Expression 18) is necessarily present on a plane of the light source color vector SL and the object intrinsic color vector $SP^d_p$.

The color vector $S_{p'}(t)$ observed another point p' on the image is also necessarily present on a plane of the light source color vector SL and the object intrinsic color vector $SP^d_{p'}$.

Figure 17:
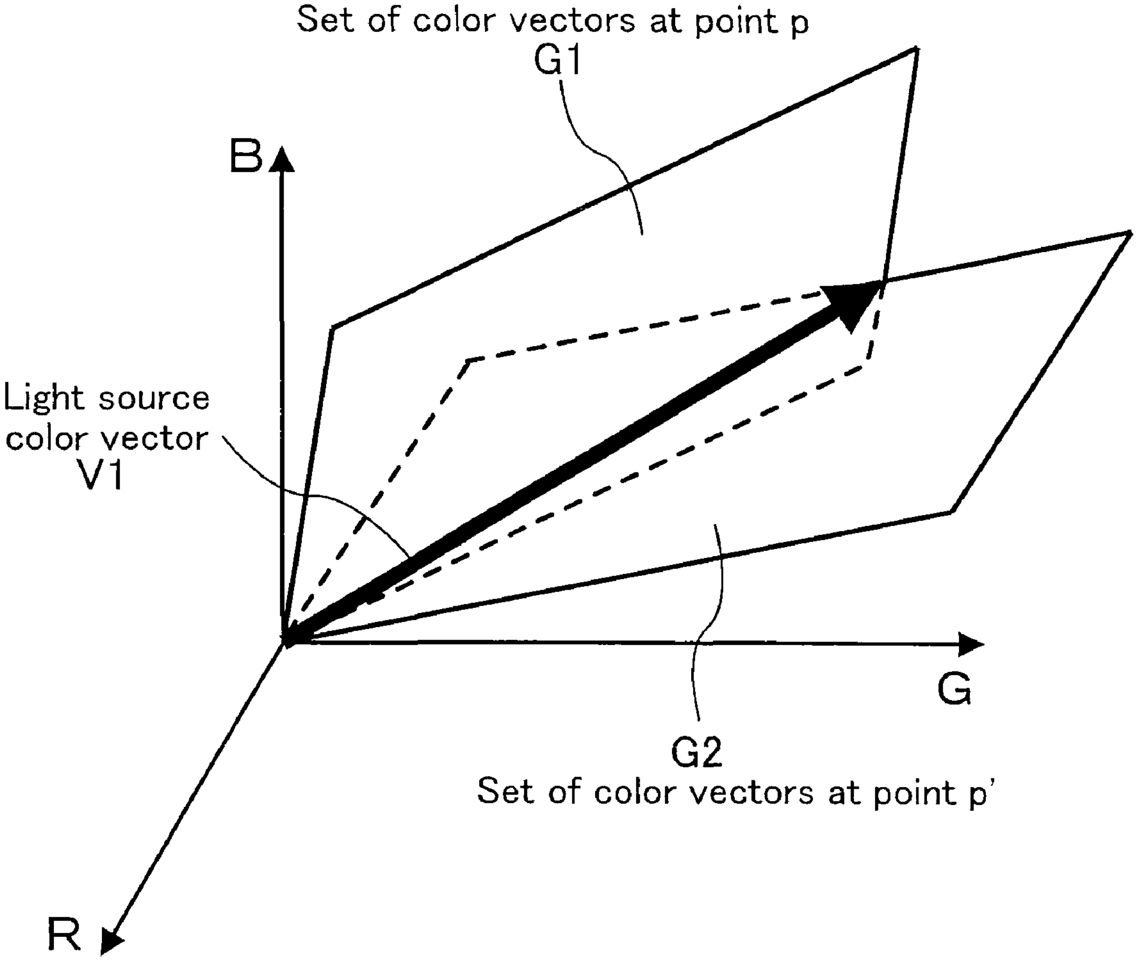
FIG. 17 is a conceptual diagram illustrating a method for estimating a light source color vector.

FIG. 17 is a diagram showing this relationship. In FIG. 17, the RGB values of each point are used as the color vector since an RGB color camera is used as the imaging device 20. In FIG. 17, G1 (G2) is a plane representing a set of color vectors in an RGB space across which the luminance at a point p (p') varies over time. The straight line V1 along which the planes G1 and G2 intersect each other is a light source color vector SL that is common between the planes G1 and G2.

Thus, it is possible to estimate a light source color vector by using a light source that blinks repeatedly. A specific example of the process will now be described.

Figure 18:
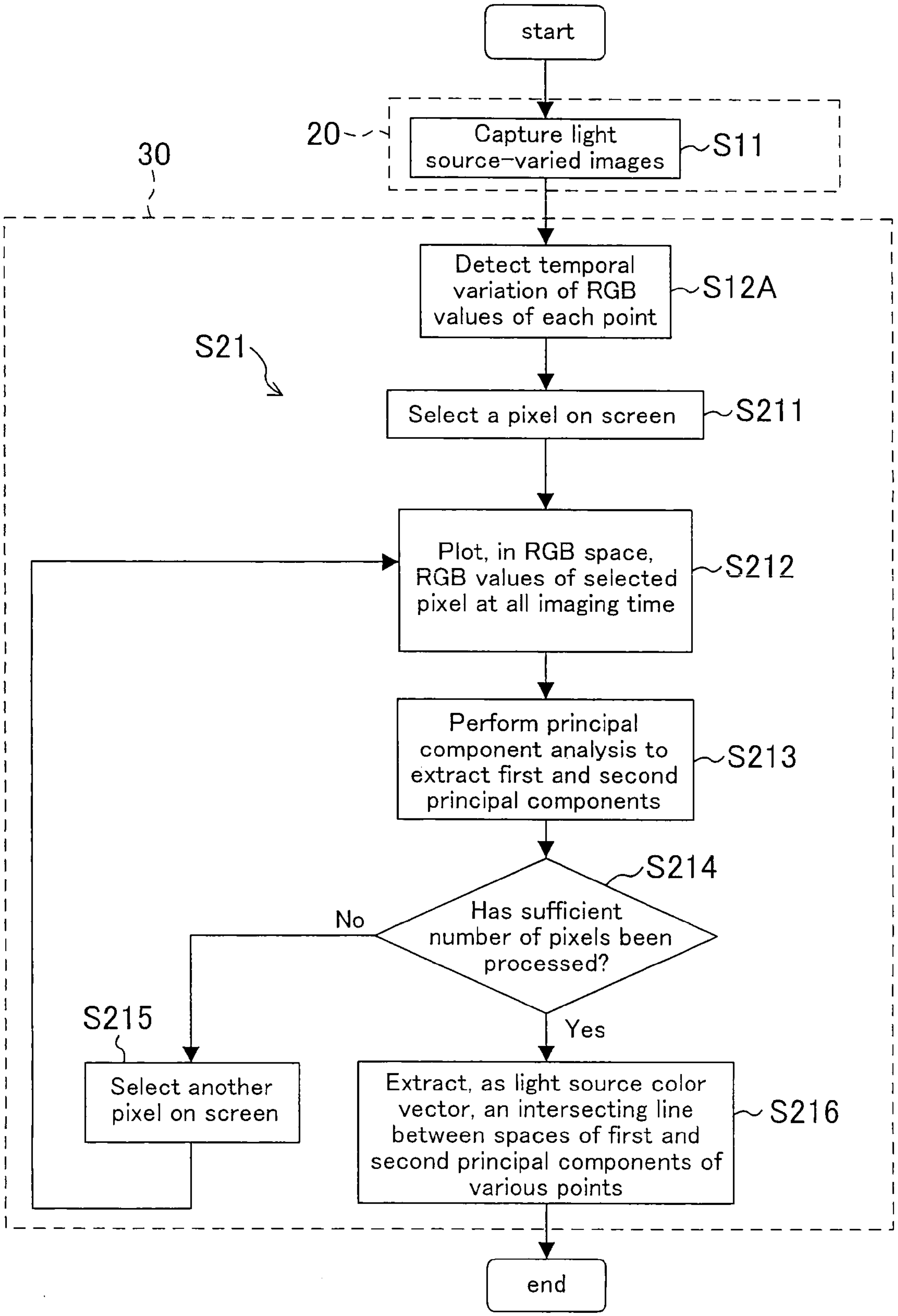
FIG. 18 is a flow chart showing the flow of the process of estimating the light source color vector according to the second embodiment of the present invention.

FIG. 18 is a flow chart showing an example of the flow of the process of estimating the light source color vector. In FIG. 18, step S12A corresponds to step S12 of FIG. 16, and steps S211 to S216 correspond to step S21 of FIG. 16.

First, the imaging device 20 captures a plurality of images that are different from one another in terms of the light source conditions (light source-varied images) (step S11). The plurality of captured images are given to the image processing device 30. The image processing device 30 first detects variations in the RGB values for each pixel to thereby detect the temporal luminance variation (step S12A). Then, the process selects a pixel on the image (step S211), and plots, in the RGB space, the RGB values of the pixel at all imaging time (step S212). A principal component analysis is performed on the set of sampling points plotted as described above to thereby extract the first and second principal components (step S213). From (Expression 18), it can be seen that a plane of the two obtained principal components is equal to the plane of the light source color vector SL and the object intrinsic color vector $SP_p^d$, where there is no noise. Then, if the principal component analysis process has not been completed for two or more pixels, for example, (No in step S214), the process selects another pixel on the image (step S215) and performs the principal component analysis on the selected pixel. If the principal component analysis has been completed for two or more pixels (Yes in step S214), the process obtains the intersecting line between a space of the two principal components of one pixel and another space of the two principal components of another pixel, and estimates that it is the light source color vector (the RGB values of the light source) (step S216).

The description has been made with respect to a case where an RGB color camera is used as the imaging device 20. It is understood that the imaging device 20 is not limited to this, and it may alternatively be a spectral luminance meter of a higher order, or the like, for example.

As described above, the present embodiment employs a plurality of light sources, such as fluorescent lamps, whose positions are fixed, whose luminance varies over time, and which have an equal light source color vector, and captures a plurality of images with a sufficiently short exposure time with respect to the luminance variation cycle, for example, to detect the luminance variations, whereby it is possible to easily estimate the light source color vector without requiring complicated facilities.

Third Embodiment

Figure 19:
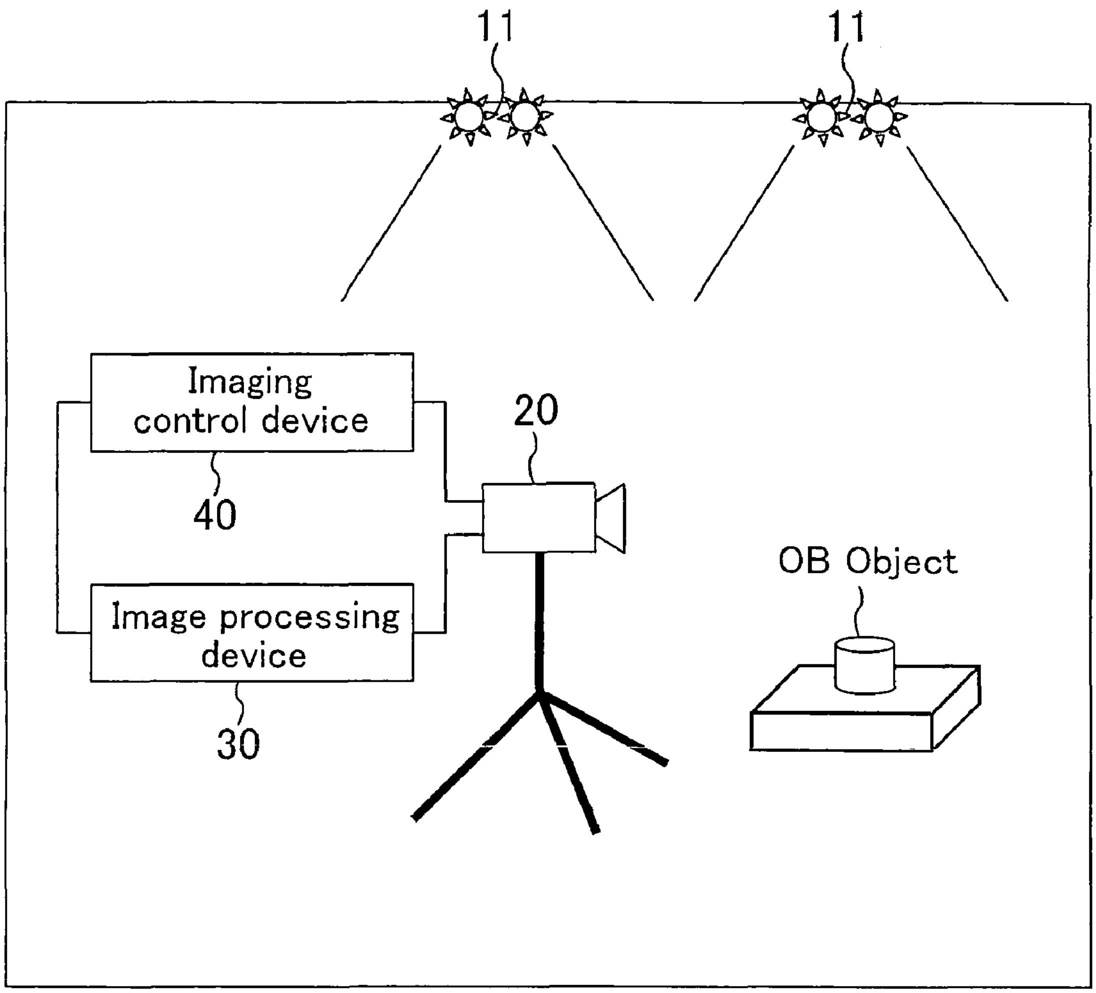
FIG. 19 is a diagram showing a configuration for realizing an image processing method according to a third embodiment of the present invention.

FIG. 19 is a diagram showing a configuration for realizing an image processing method according to a third embodiment of the present invention. In FIG. 19, like elements to those of FIG. 1 are denoted by like reference numerals to those of FIG. 1, and will not be further described below. The configuration differs from that of FIG. 1 in that an imaging control device 40 is provided for controlling the imaging conditions of the imaging device 20 according to the imaging conditions determined by the image processing device 30.

Figure 20:
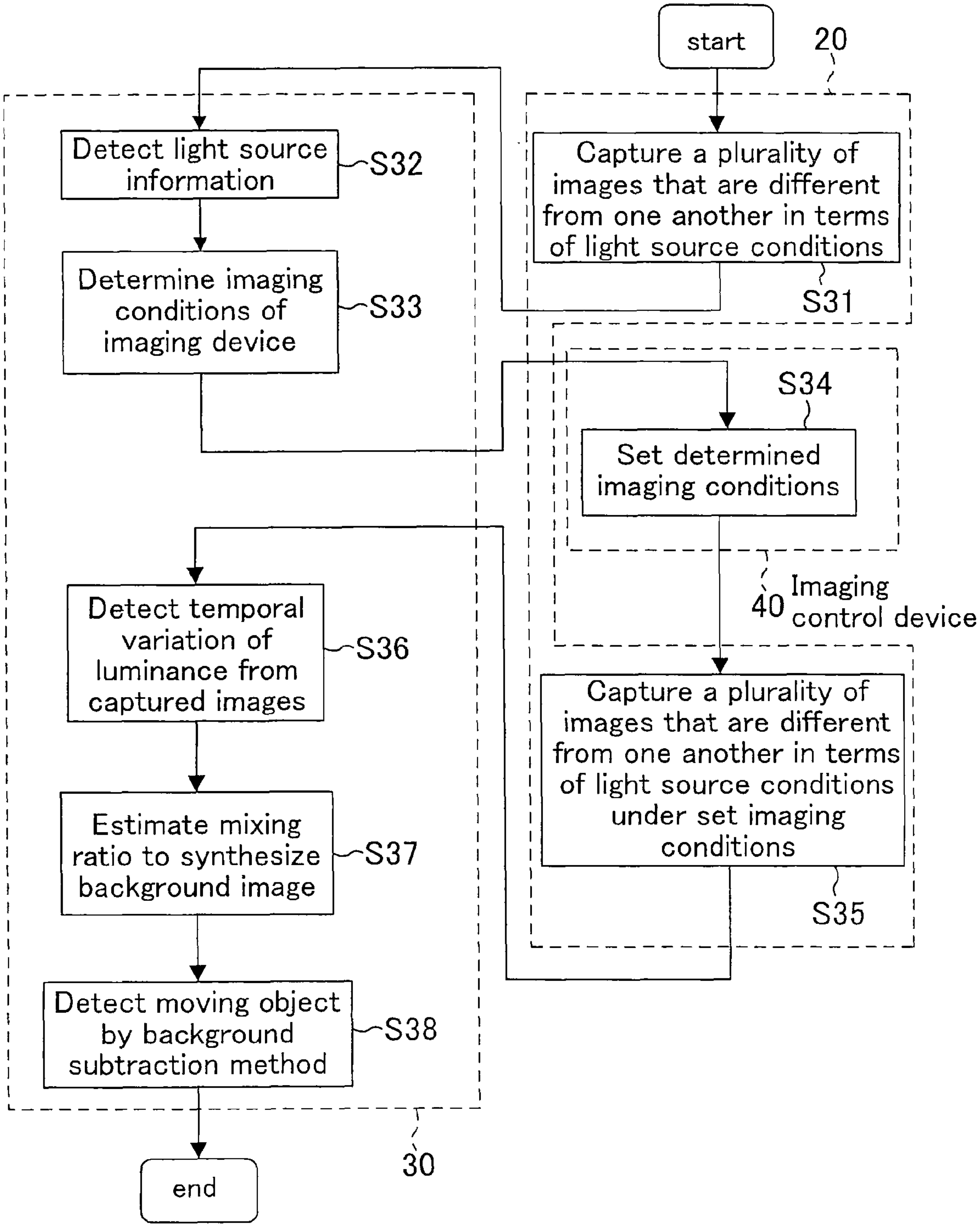
FIG. 20 is a flow chart showing processes of an image processing method according to the third embodiment of the present invention.

FIG. 20 is a flow chart showing processes of the image processing method according to the present embodiment. In the present embodiment, before images are actually captured (step S35), the process detects light source information and sets optimal imaging conditions based on the light source information (steps S31 to S34). Step 35 corresponds to the imaging step, and steps S36 to S38 correspond to the image processing step. The description will be made with respect to an example where a moving object detection process is performed as the image process.

First, the imaging device 20 captures a plurality of images with an exposure time shorter than the luminance variation cycle of the light source 11 (step S31). The image processing device 30 detects the light source information in the imaging environment from the captured images (step S32). Specifically, the process detects the luminance variation cycle of the light source 11 whose luminance varies over time, for example. The description will be made with respect to an example where a fluorescent lamp is used as the light source 11.

With an ordinary fluorescent lamp, the luminance varies with a cycle that is twice the AC frequency. Therefore, the observed luminance varies over time as does the luminance value A4 of FIG. 4. Then, it is possible to obtain the luminance variation frequency of the light source by performing a process of fitting a sine function, or the like, to the obtained luminance values. Such a fitting process can be realized by using an optimization method such as a Levenberg-Marquardt method.

Of course, the light source itself may be imaged by a camera so as to detect the light source information from the luminance variations. Alternatively, the light source information may be sent to the image processing device 30 by using communications means provided separately. It is effective to perform such a process by using a visible light communication process as described above. Specifically, where an LED light source is used, the light source information can be communicated by periodically modulating in time the luminance of the light source.

Then, in step S33, imaging conditions, e.g., the exposure time, the imaging timing and the imaging cycle, of the imaging device 20 are set so that a plurality of images that are different from one another in terms of the light source conditions can be captured.

The relationship of the exposure time and the imaging timing with respect to the observed luminance values will now be described with reference to the drawings. As described above in the first embodiment, if image capturing is repeated with a sufficiently short exposure time with respect to the luminance variations of the light source under fluorescent lamp lighting (FIG. 3), the luminance value varies over time as shown in FIG. 4.

Figure 21:
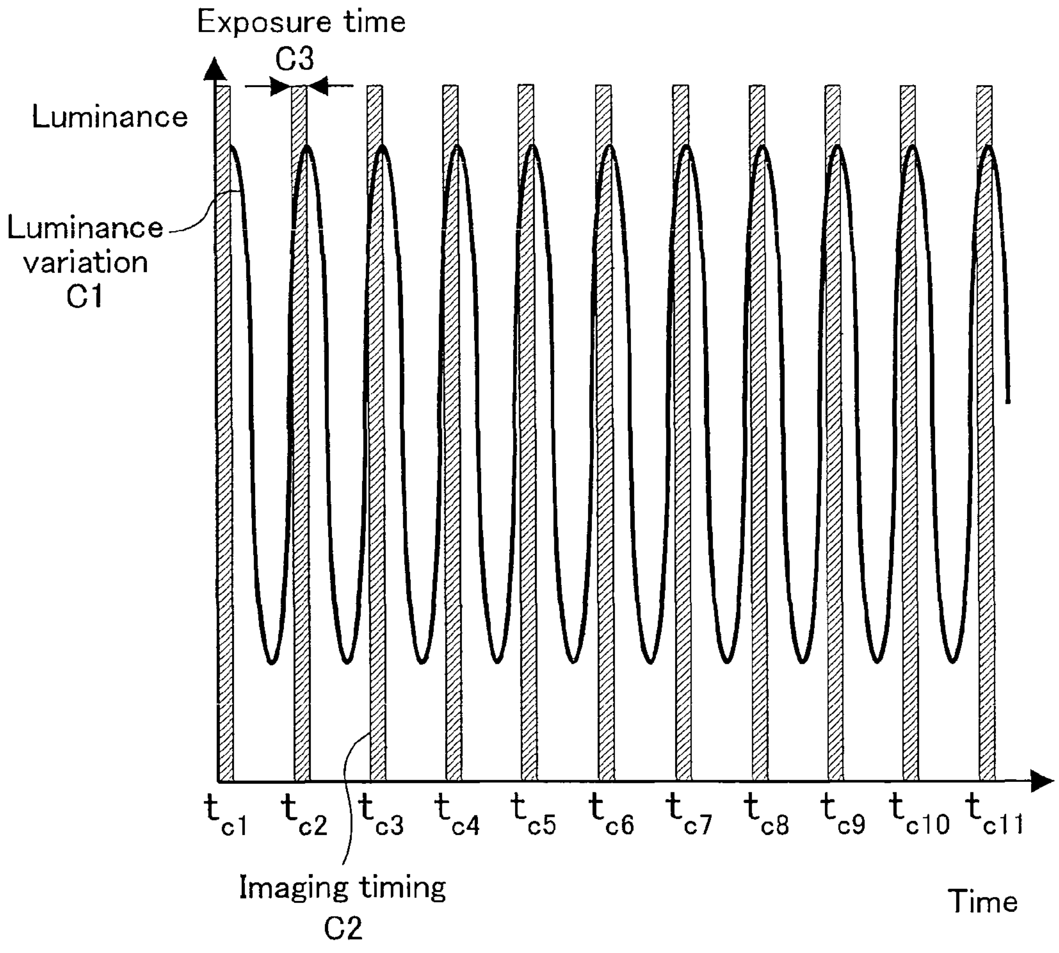
FIG. 21 is a conceptual diagram showing a case where images are captured in synchronism with the light source luminance variations.
Figure 22:
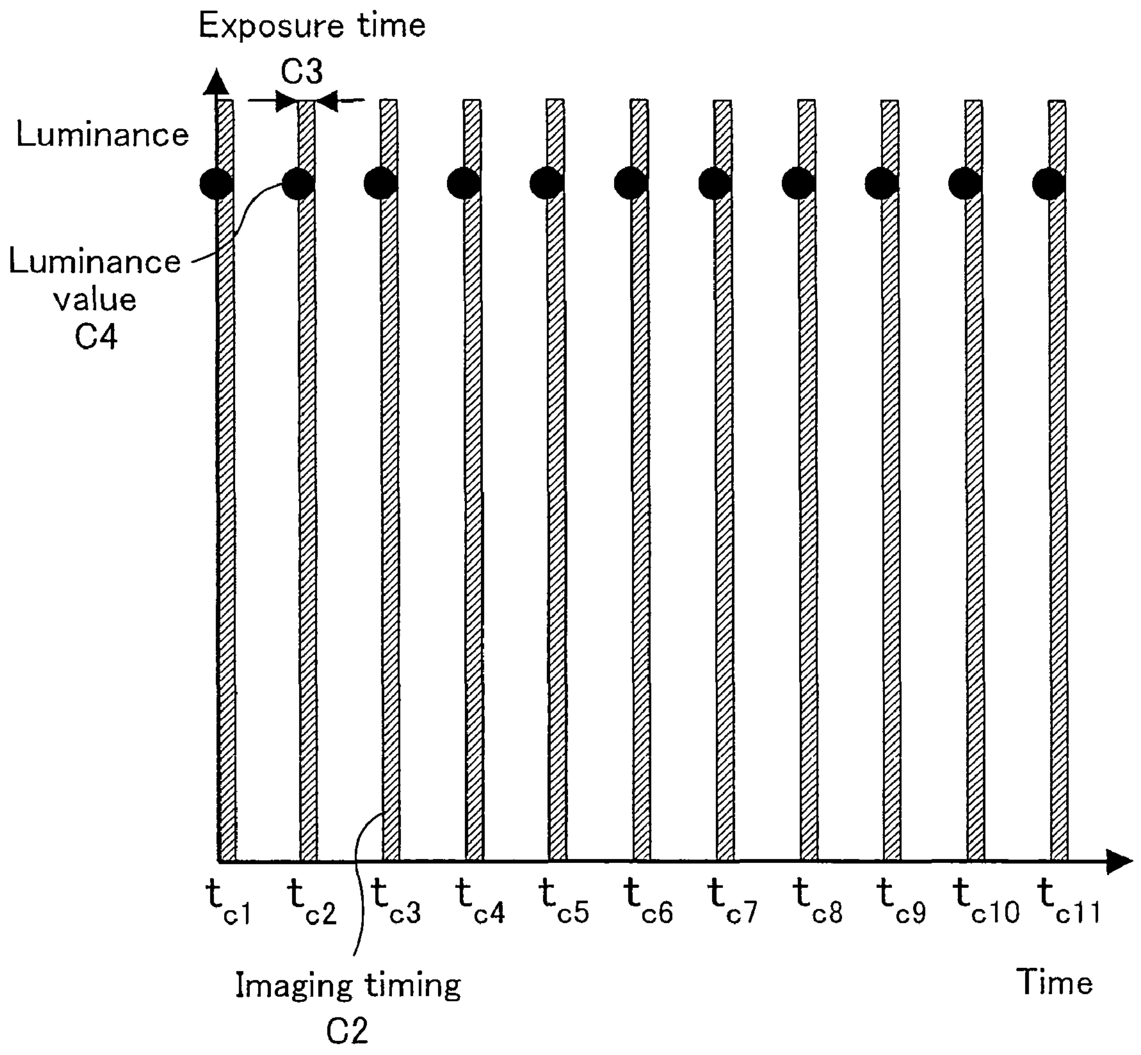
FIG. 22 is a diagram showing luminance values observed under the condition of FIG. 21.

If images are captured performed with an imaging timing C2 (an exposure time C3) in synchronism with the luminance variation C1 of the light source as shown in FIG. 21, luminance values C4 as shown in FIG. 22 will be observed. It can be seen from FIGS. 21 and 22 that the luminance value C4 to be observed does not vary over time if images are captured with the imaging timing C2 in synchronism with the luminance variation C1 of the light source.

Figure 23:
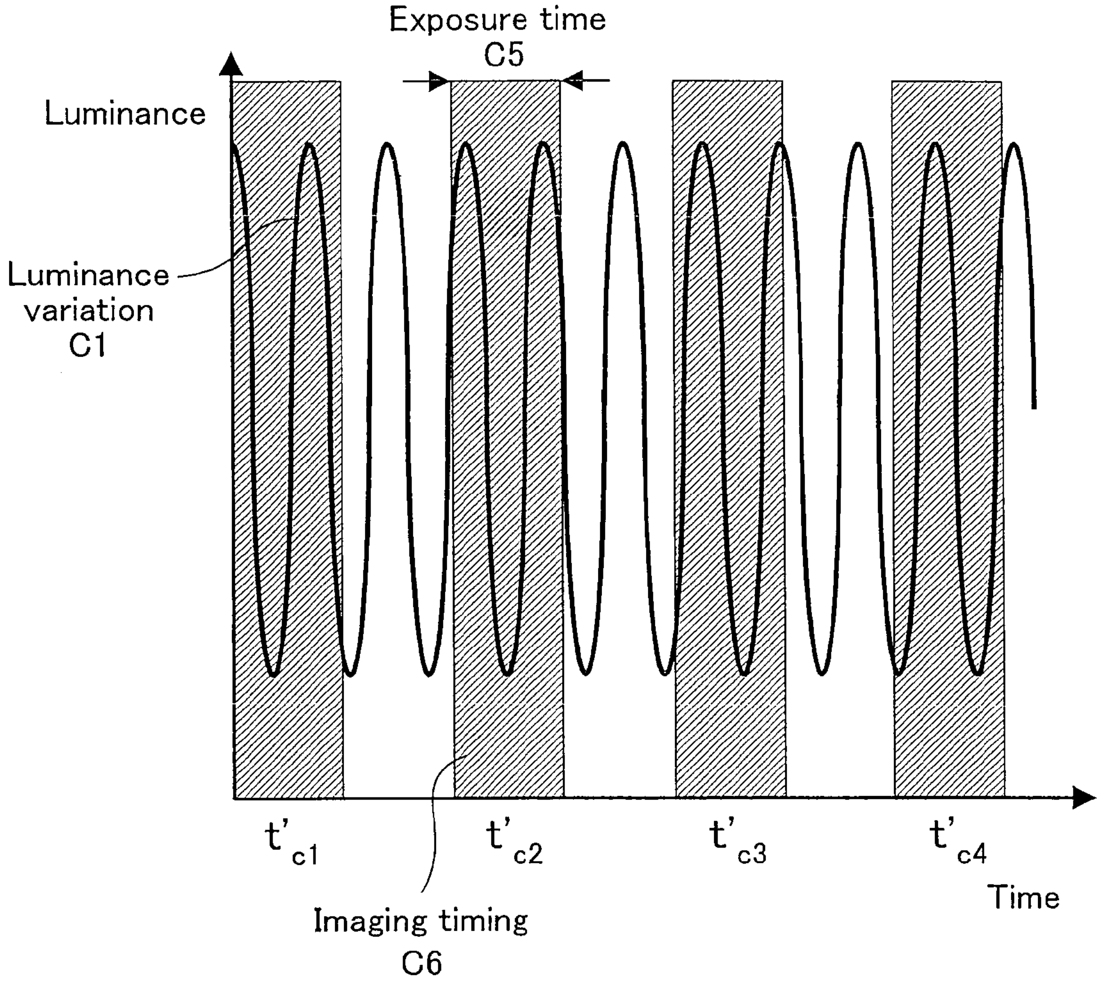
FIG. 23 is a conceptual diagram showing a case where images are captured with an exposure time that is sufficiently long with respect to the light source luminance variations.
Figure 24:
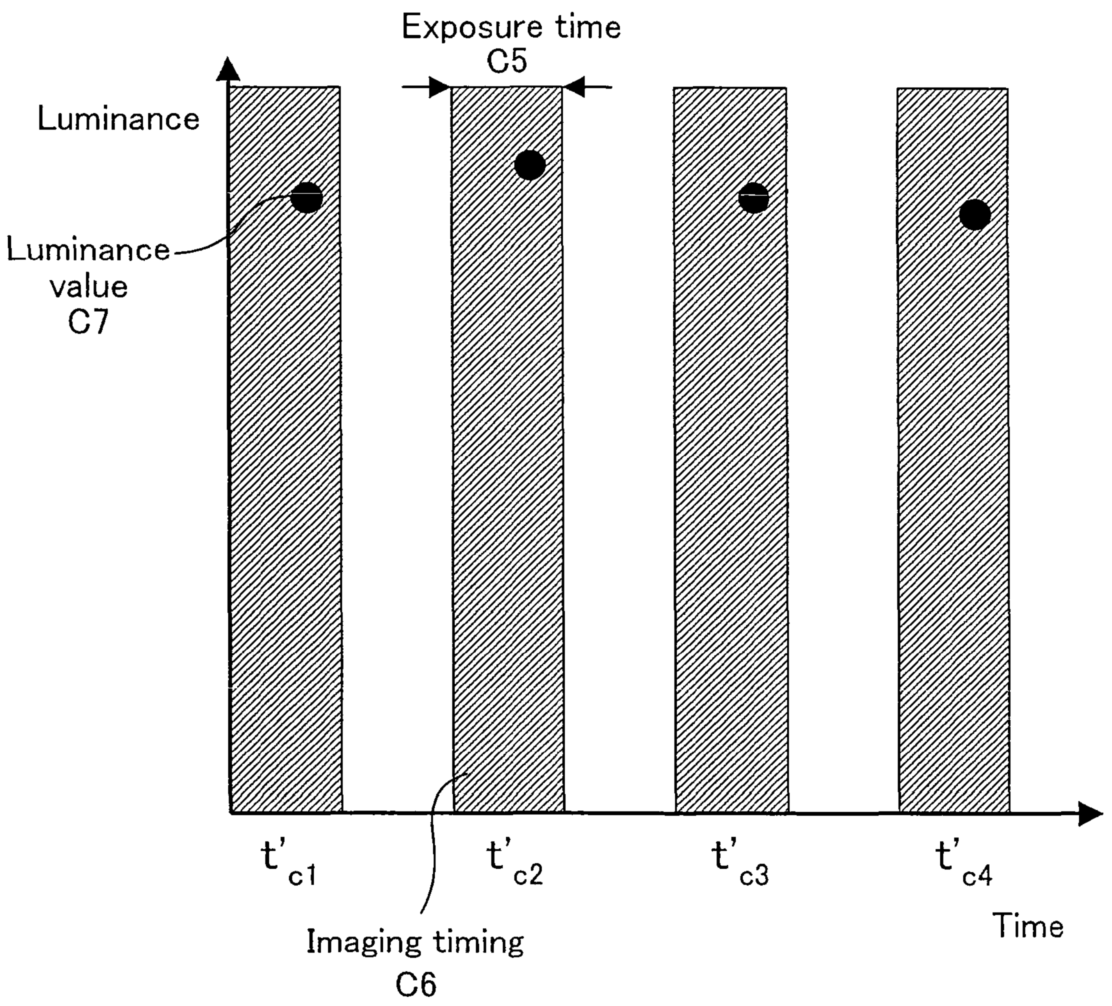
FIG. 24 is a diagram showing luminance values observed under the condition of FIG. 23.

If images are captured with an exposure time C5 (an imaging timing C6) sufficiently long with respect to the luminance variation C1 of the light source as shown in FIG. 23, luminance values C7 as shown in FIG. 24 will be observed. It can be seen from FIGS. 23 and 24 that if the exposure time C5 is sufficiently long with respect to the luminance variation C1 of the light source, the integration effect serves as a smoothing process for the luminance variation C1, whereby the luminance value C7 to be observed does not substantially vary.

As can be seen from the above, whether the luminance varies over time depends on the settings of the exposure time and the imaging timing.

In view of this, in step S33, the process sets an imaging cycle that is different from the luminance variation cycle of the light source detected in step S32, and an exposure time that is sufficiently short with respect to the luminance variation cycle of the light source. Thus, the imaging cycle Ts is set so as to satisfy the following relational expression with respect to the luminance variation cycle T1 of the light source.

[Expression 19]

$$Ts \neq \frac{Tl}{a} \quad \text{(Expression 19)}$$

Herein, a is a positive integer. This may be set as follows, for example.

[Expression 20]

$$Ts = b\frac{Tl}{a} \quad \text{(Expression 20)}$$

where a≠c·b
a and b are each a positive integer, and c is any positive integer.

In step S33, in order to determine the imaging conditions such as the exposure time and the imaging timing, the process may use the luminance of the light source, the distance between the object and the light source, the distance between the light source and the imaging device, etc. With regard to this, how the range of luminance variation is taken into consideration will be described.

In order to capture images through which the luminance varies over time, it is important to select the imaging conditions so that the range of luminance variation is optimized.

Figure 25:
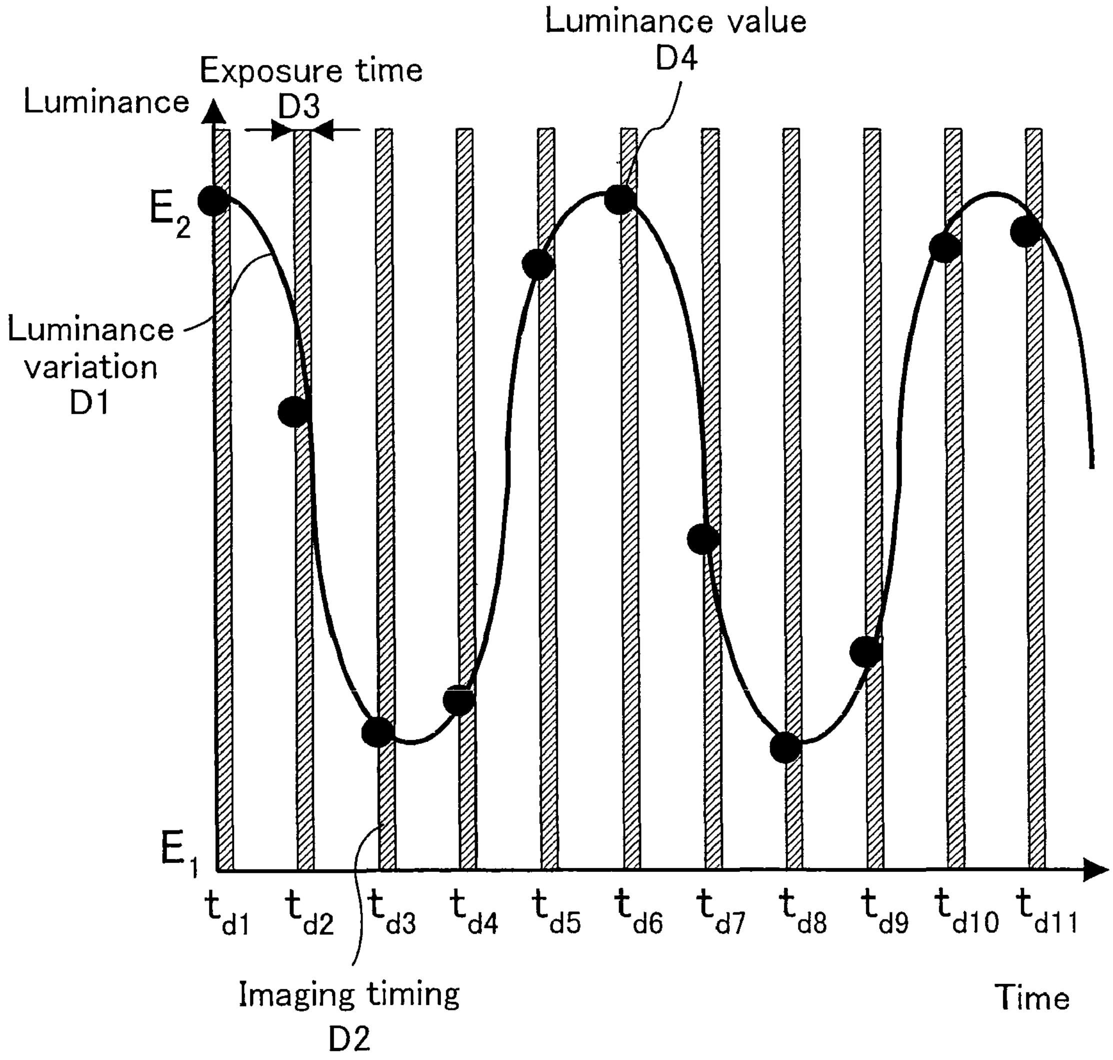
FIG. 25 is a diagram showing an example of luminance variations on the object in a case where the light source luminance varies over a wide range.
Figure 26:
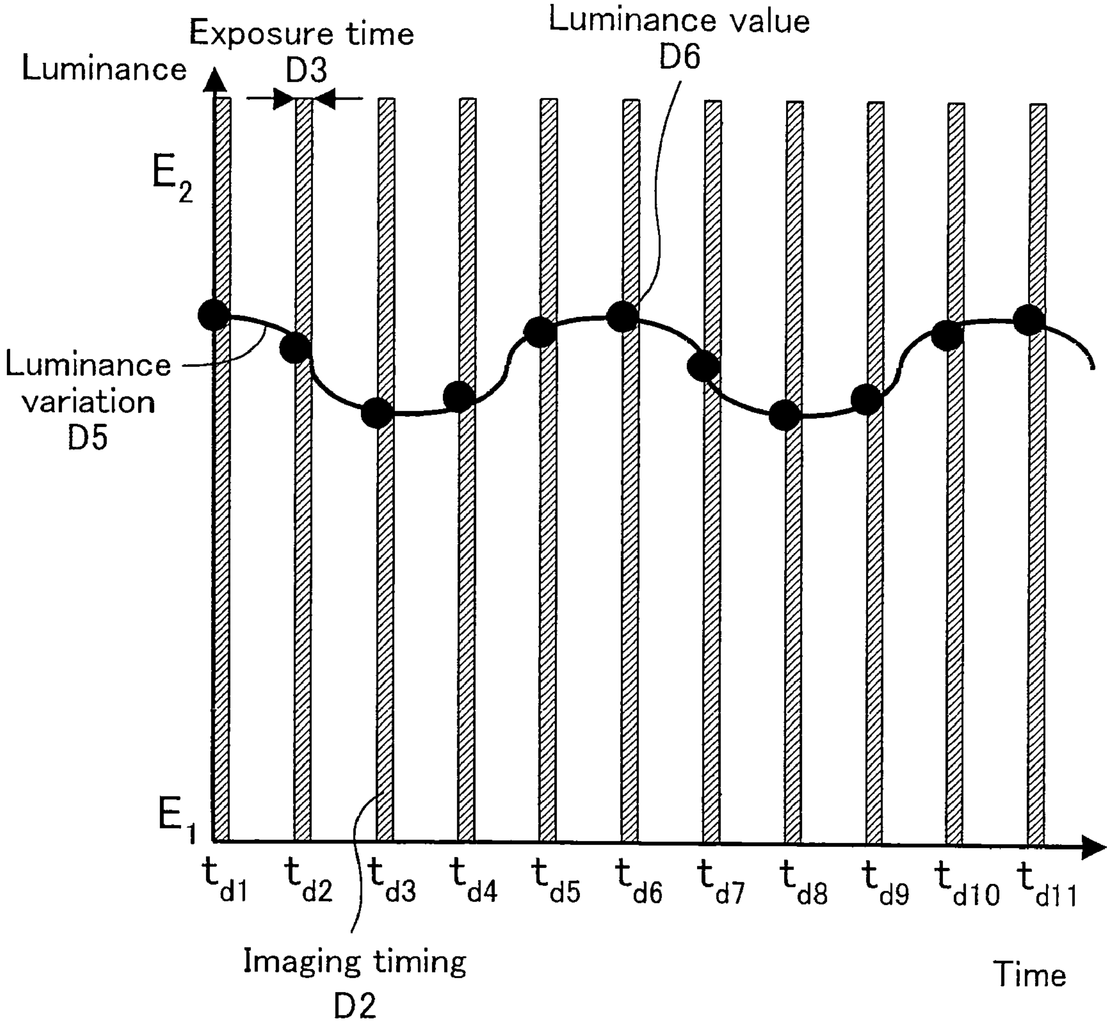
FIG. 26 is a diagram showing an example of luminance variations on the object in a case where the light source luminance varies over a small range.

FIGS. 25 and 26 are graphs each showing an example of luminance variations at a point on the object under fluorescent lamp lighting. FIG. 25 shows a case where the range of luminance variation D1 of the light source is sufficiently large, and FIG. 26 shows a case where the range of luminance variation D5 of the light source is sufficiently small. In these figures, the luminance values E1 and E2 on the vertical axis denote the same luminance value, and the time td11 to time td11 (the imaging timing D2) on the horizontal axis denote the same time. D3 denotes the exposure time, and solid circles D4 and D6 denote the observed luminance values.

As can be seen from a comparison between FIG. 25 and FIG. 26, even though images are captured with the same imaging timing D2, the observed luminance values D4 and D6 are significantly different from each other because of the difference between the ranges of the luminance variations D1 and D5 of the light source. In the case of FIG. 25, the range of the luminance variation D1 is sufficiently large, whereby it is possible to capture a plurality of images through which the luminance value varies sufficiently. In the case of FIG. 26, the range of the luminance variation D5 is small, whereby the luminance differences between a plurality of images will not be very large. In such a case, it can be said that it is sufficient to capture images only at points in time td1, td3, td5, td7, td9 and td11, for example, doubling the imaging interval.

Normally, the amount of light is lower further away from the light source, and thus the luminance variation range of the object is dependent on the distance between the light source and the object. Therefore, it may be determined that the amount of light is sufficient when the object is sufficiently close to the light source, in which case the imaging interval may be shortened, whereas it may be determined that the amount of light is small when the object is sufficiently far away from the light source, in which case the imaging interval may be increased.

Of course the imaging condition to be set as described above is not limited to the imaging interval. For example, the exposure time can be set in a similar manner. When the amount of light is small, an image may get buried under noise such as the dark current, thus deteriorating the SN ratio. However, it is known that if the exposure time can be extended, the SN ratio can be improved. Therefore, it may be determined that the amount of light is sufficient when the object is sufficiently close to the light source, in which case the exposure time may be set to be short, whereas it may be determined that the amount of light is small when the object is sufficiently far away from the light source, in which case the exposure time may be set to be long.

Figure 27:
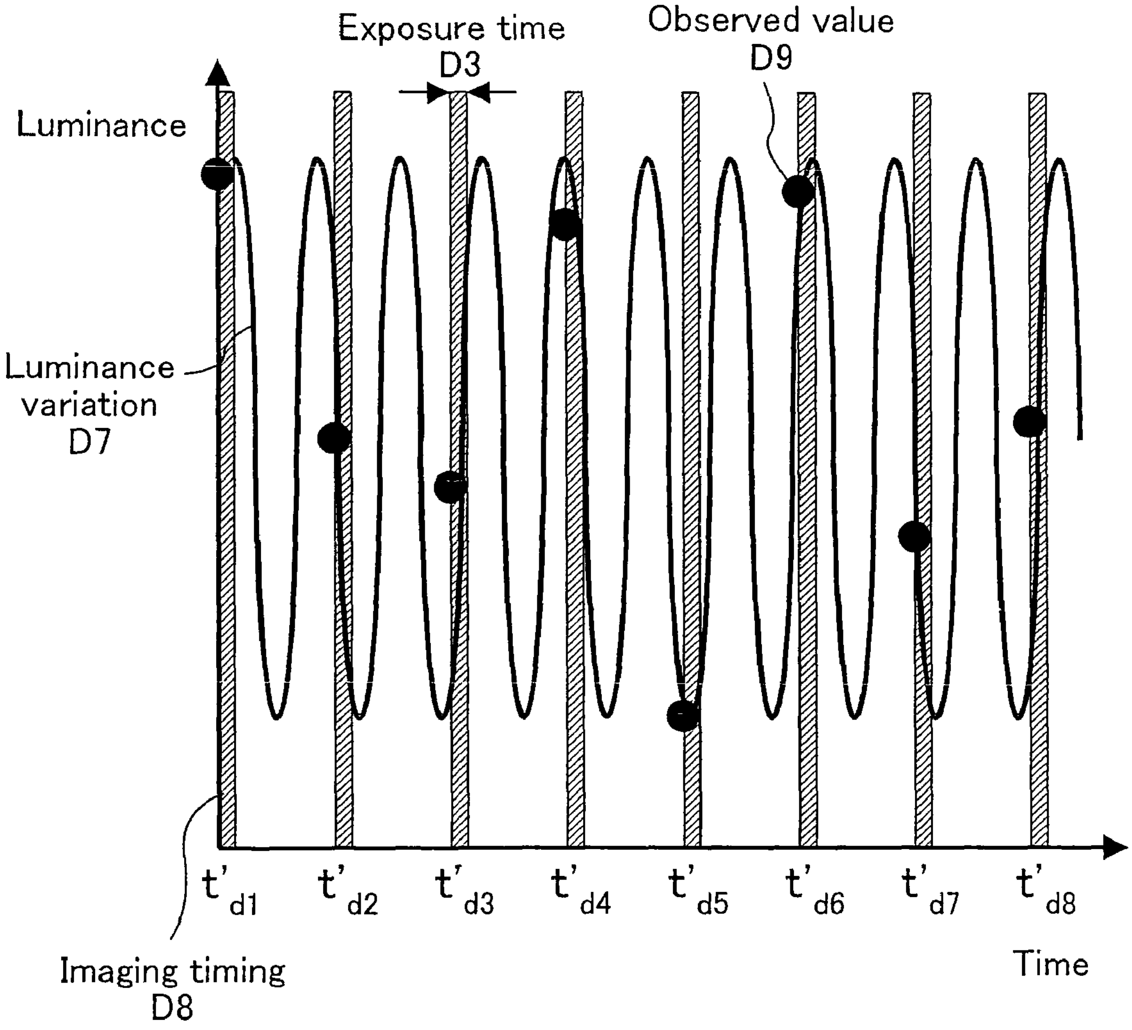
FIG. 27 is a conceptual diagram showing an example where the imaging interval is set to be longer than the blinking interval.

As shown in FIG. 27, the imaging interval (the imaging timing D8) may be set to be longer than the blinking interval of the light source. Herein, the imaging cycle Ts is set so that it will not be an integral submultiple of the luminance variation cycle T1 of the light source as described above, whereby images can be captured with the phase being shifted from the blinking of the light source. Thus, the observed luminance value D9 varies significantly, and it is possible to capture a plurality of images that are different from one another in terms of the light source conditions.

Then, the imaging control device 40 sets the imaging conditions of the imaging device 20 according to the imaging conditions determined in step S33 (step S34). The imaging device 20 images an object a plurality of times in time series under the determined imaging conditions (step S35). Since the exposure time and the imaging timing are set based on the luminance variation cycle of the light source as described above, the plurality of captured images are images that are different from one another in terms of the light source conditions.

As opposed to the imaging process of step S31, optimal imaging conditions are set in the imaging process of step S35. As described above in the first embodiment, normally, a plurality of images that are different from one another in terms of the light source conditions can be captured by setting the exposure time of the imaging device 20 to be sufficiently short with respect to the luminance variation of the light source. However, if the exposure time is set too short, the influence of the dark current on the image becomes significant, deteriorating the SN ratio of the captured images. Since it is desirable that images to be subjected to an image process have high SN ratios, optimizing the imaging conditions as in the present embodiment is very advantageous.

In step S36, the image processing device 30 detects the temporal luminance variation as described above from the plurality of images captured in step S35. Then, as the image process, a moving object is detected by using the background subtraction method. Specifically, the process estimates the mixing ratio to be described later from the temporal luminance variation to synthesize a background image (step S37), and the moving object is detected by comparing the background image with images captured in step S35 (step S38).

The synthesis of the background image will now be described. Non-Patent Document 1 separates the luminance of a captured image into a light source component that does not vary over time and a light source component whose brightness varies rapidly to estimate the mixing ratio therebetween, thus producing a background image according to light source conditions at the time of processing. Thus, it is possible to detect the moving object without being influenced by shadows and luminance variations of the light source. Specifically, the color of an object observed under an outdoor environment is considered as being composed of an all-sky light component L1 that does not vary over time and a direct sunlight component L2 whose brightness varies rapidly when the direct sunlight is blocked by a cloud. Then, by estimating the mixing ratio therebetween as shown in (Expression 21), it is possible to realize an accurate synthesis of the background image.

[Expression 21]

$$\begin{cases} R = R_1 + kR_2 \\ G = G_1 + kG_2 \\ B = B_1 + kB_2 \end{cases} \quad \text{(Expression 21)}$$

Herein, R, G and B denote the R, G and B component images of the captured image, $R_1$, $G_1$ and $B_1$ denote the R, G and B component images of the component L1, and $R_2$, $G_2$ and $B_2$ denote the R, G and B component images of the component L2. Moreover, k denotes the mixing ratio of the component image.

In this method, the all-sky light component L1 is the light source that does not vary over time, and the direct sunlight component L2 is the light source whose brightness varies rapidly. This is not limited to an outdoor environment. For example, while a fluorescent lamp is used as a lighting device in a house, the fluorescent lamp lighting can be considered as being the light source component L2 whose brightness varies. In such a case, in order to obtain the component images $R_2$, $G_2$ and $B_2$ of the component L2 of (Expression 21), it is necessary to capture a plurality of images through which the luminance of the fluorescent lamp varies. Normally, in order to realize such a parameter estimation, the least squares method, the maximum likelihood estimate method, or the like, is employed using a plurality of data so as to improve the accuracy and reliability. The data used are preferably those that have been sampled in a non-biased manner and those whose range of variation is sufficiently large and non-biased.

In the present embodiment, by using a light source whose luminance varies over time such as a fluorescent lamp, it is possible to capture light source-varied images through which the luminance varies over time, with the degree of luminance variations being sufficient. Moreover, by using light source-varied images through which the luminance varies sufficiently, it is possible to obtain sampling points whose range of variation is sufficiently large and non-biased, whereby it is possible to produce the background image accurately and with high reliability. Therefore, it is possible to also improve the accuracy and reliability of the process of detecting the moving object.

Figure 28:
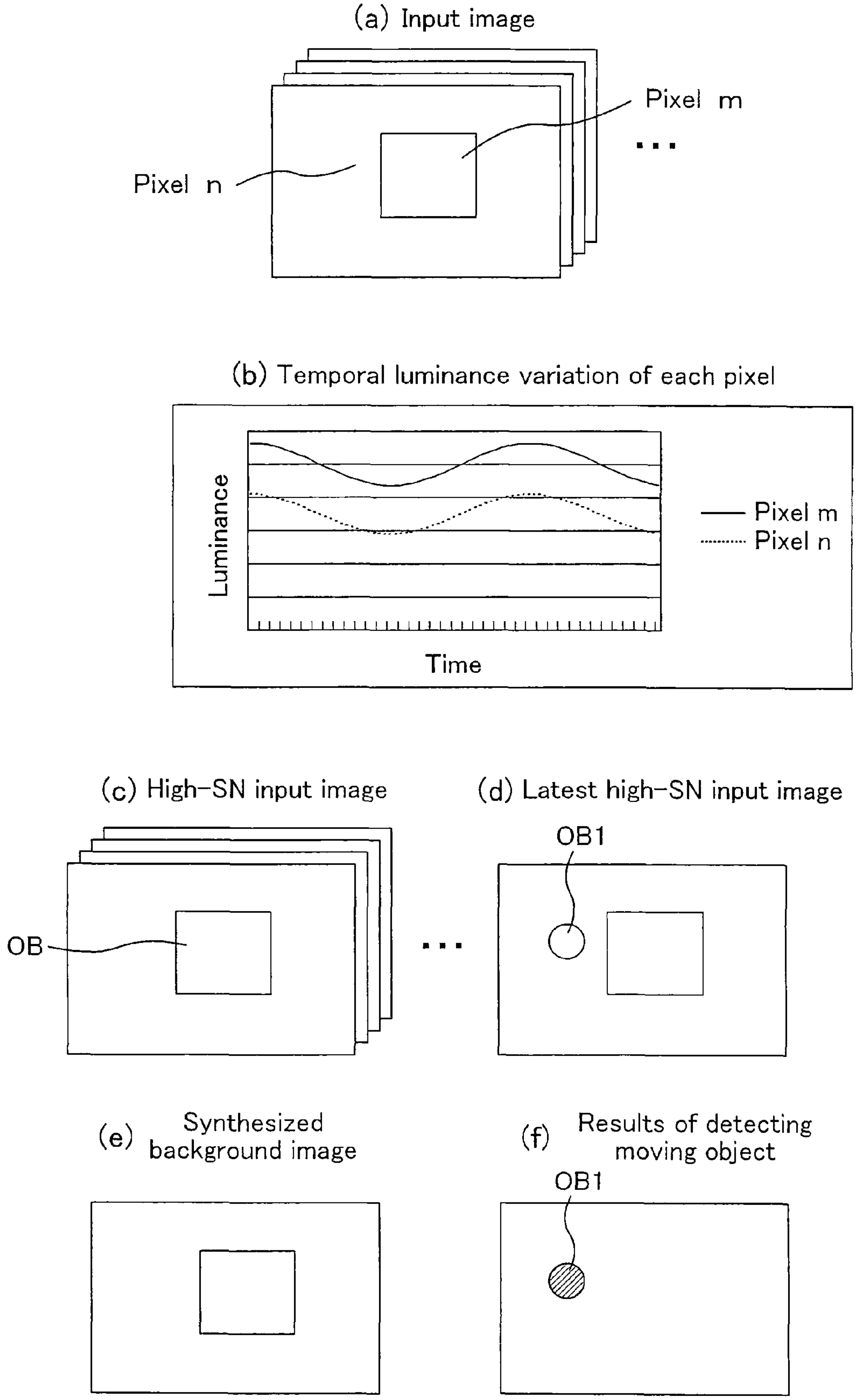
FIG. 28 is a diagram showing an example of image process results obtained in the third embodiment of the present invention.

FIG. 28 is a diagram showing an example of image process results obtained in the present embodiment. In the figure, FIG. 28(*a*) is an input image obtained by imaging the object OB with the configuration of FIG. 6 (step S31), and FIG. 28(*b*) is a schematic diagram of the detected light source information (step S32), showing temporal luminance variations of pixels m and n in the input image of FIG. 28(*a*). A frequency analysis such as an FFT (Fast Fourier Transform) is performed on the temporal luminance variations to thereby obtain the blinking frequency of the light source. Optimal imaging conditions are determined based on the obtained blinking frequency of the light source (step S33), and the imaging conditions are set in the imaging device 20 (step S34), after which the object OB is imaged again (step S35). As a result, input images as shown in FIG. 28(*c*) are obtained.

It is assumed herein that a moving object OBI is present in the latest captured image as shown in FIG. 28(*d*). On the other hand, the process estimates the mixing ratio to thereby synthesize a background image that matches the current light source environment as shown in FIG. 28(*e*) (steps S36 and S37). Then, it is possible to detect the moving object OB1 as shown in FIG. 28(*f*) by performing a differential process between the image of FIG. 28(*d*) and the synthesized background image of FIG. 28(*e*).

As described above, according to the present embodiment, even under an ordinary living environment, images captured by using a plurality of light sources whose luminance varies over time under imaging conditions optimal for the luminance variation cycle of the light sources are used to estimate the mixing ratio, and a background subtraction method is performed to realize a moving object detection that is not influenced by shadows and luminance variations of the light source.

Moreover, the light source information detected in step S32 is not limited to the luminance variation cycle of the light source, but may alternatively be, for example, the luminance variation range or the light source position information.

Figure 29:
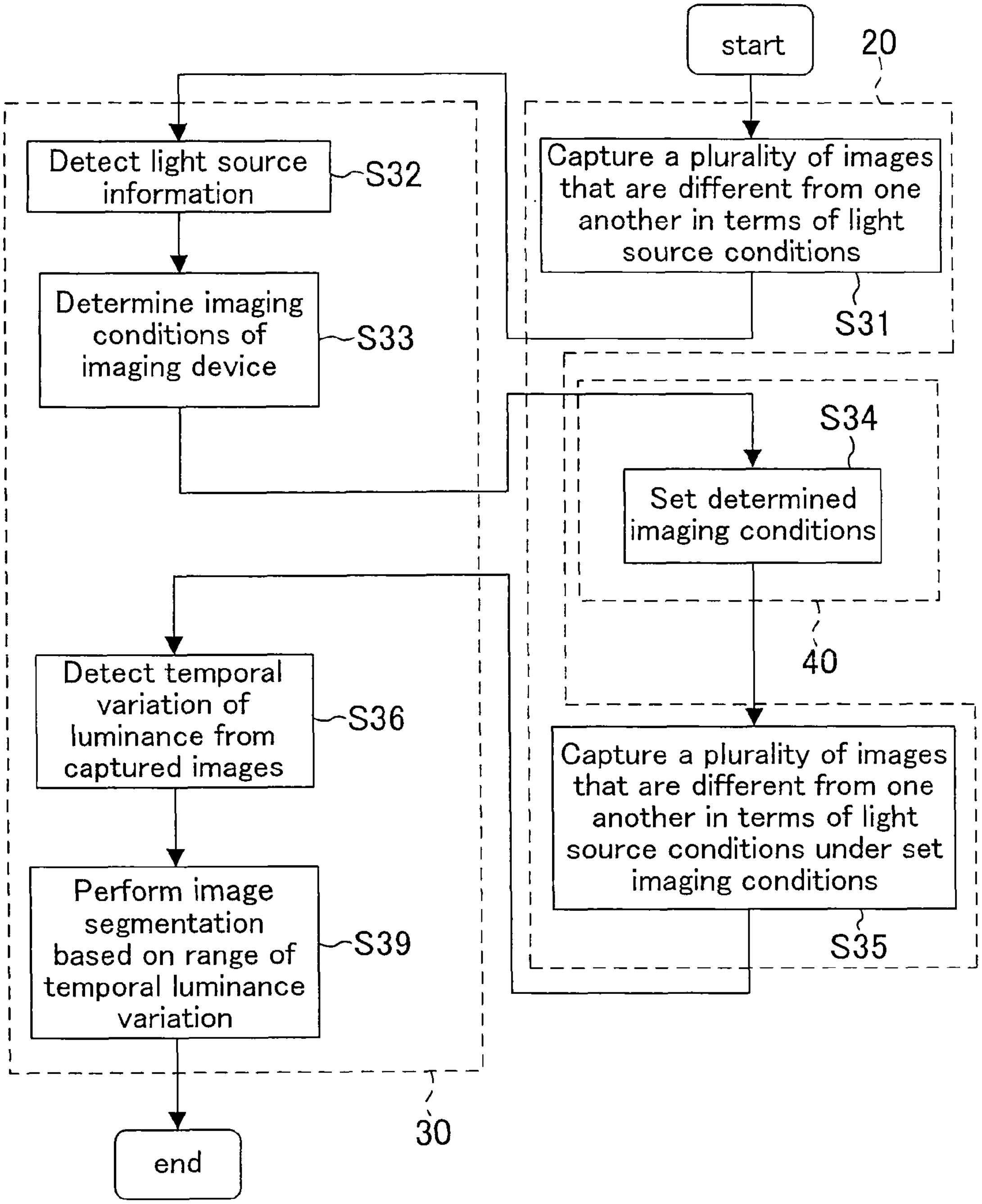
FIG. 29 is a flow chart showing another example of processes of the image processing method according to the third embodiment of the present invention.

FIG. 29 is a flow chart showing another example of processes of the image processing method according to the present embodiment. The description will be made with respect to a case where an image segmentation process for a photometric linearization process is performed as the image process. In FIG. 29, like steps to those of the flow chart of FIG. 20 are denoted by like reference numerals, and will not be further described below. A difference from FIG. 20 is that an image segmentation is performed in step S39 after detecting the temporal luminance variation in step S36. Steps S36 and S39 correspond to the image processing step.

The photometric linearization process assumes that the light source is a directional light source. A directional light source is a point light source lying at infinity. For example, sunlight is considered as being a directional light source. In contrast, a light source such as a fluorescent lamp in a house, which radiates light over a wide angle, is considered as being a collection of near point light sources. Methods are known in which an image is divided into portions for performing a photometric linearization process under such a near point light source environment (see, for example, Satoshi Sato, Kazutoyo Takata, Kunio Nobori, "Evaluation of Photometric Linearization of Images Obtained under Point Light Source", Information Processing Society of Japan Technical Report 2004-CVIM-145, pp. 151-156, 2004).

With this method, an image is divided into process areas, and a photometric linearization is performed for each process area. Using the fact that sets of linearization coefficients have strong correlation between regions, the process can be performed even in those processing areas where linearization is difficult to perform. Moreover, by synthesizing a base image while changing how the image is divided into areas, it is possible to perform a photometric linearization even under near lighting.

In this case, the issue is how to divide the image. Takahiro Okabe, Yoichi Sato, "Effects of Image Segmentation for Approximating Object Appearance under Near Lighting", Technical Report of the Institute of Electronics, Information and Communication Engineers, PRMU 2004-148, pp. 85-90, 2004 shows that such an image segmentation can be performed so that areas closer to the light source are smaller. Thus, by obtaining the distance between the light source and each point on the image, it is possible to perform a better image segmentation. In the present embodiment, such an optimal image segmentation can be performed in step S39.

Figure 30:
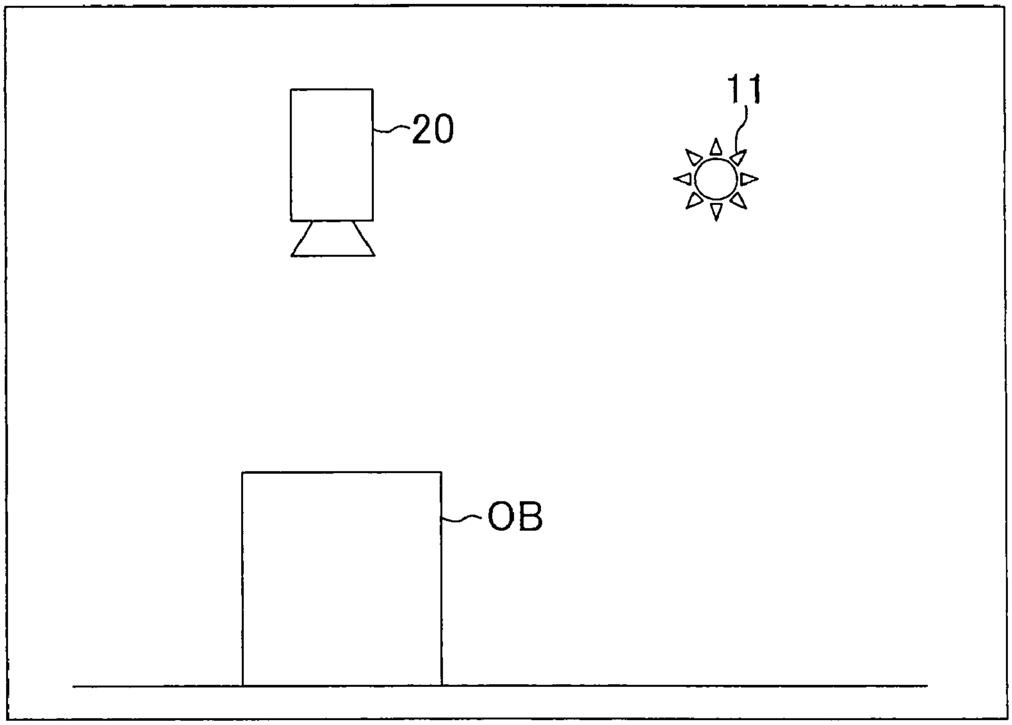
FIG. 30 is a conceptual diagram illustrating the relationship between the distance from the light source and the luminance variation range, and an image segmentation based on the relationship.
Figure 30:
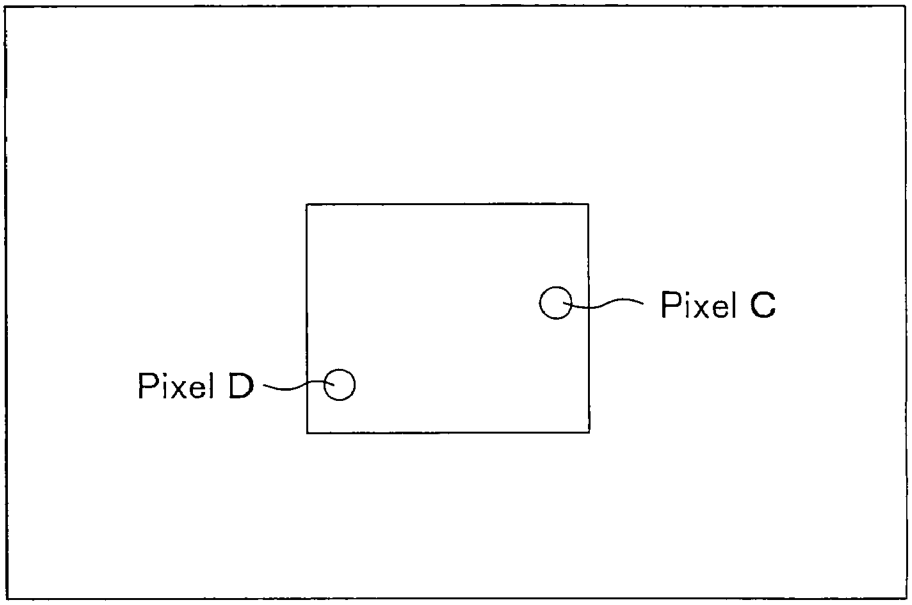
Figure 31:
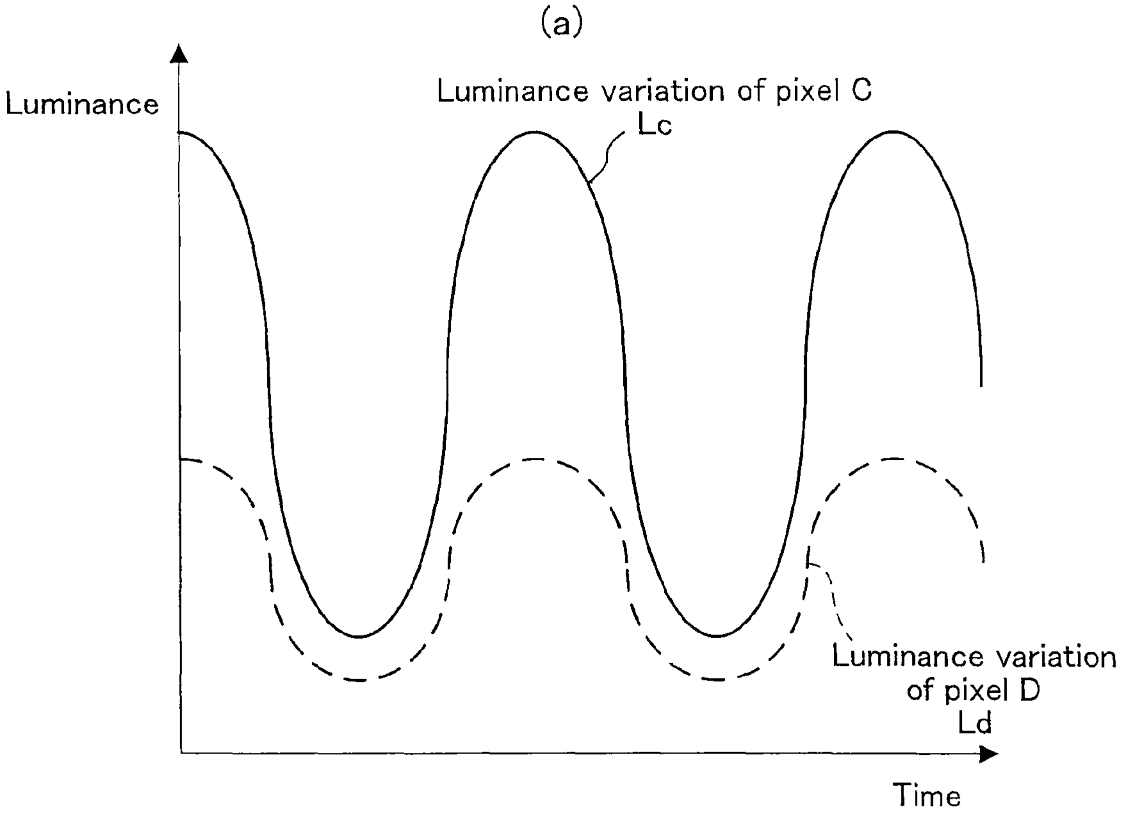
FIG. 31 is a conceptual diagram illustrating the relationship between the distance from the light source and the luminance variation range, and an image segmentation based on the relationship.
Figure 31:
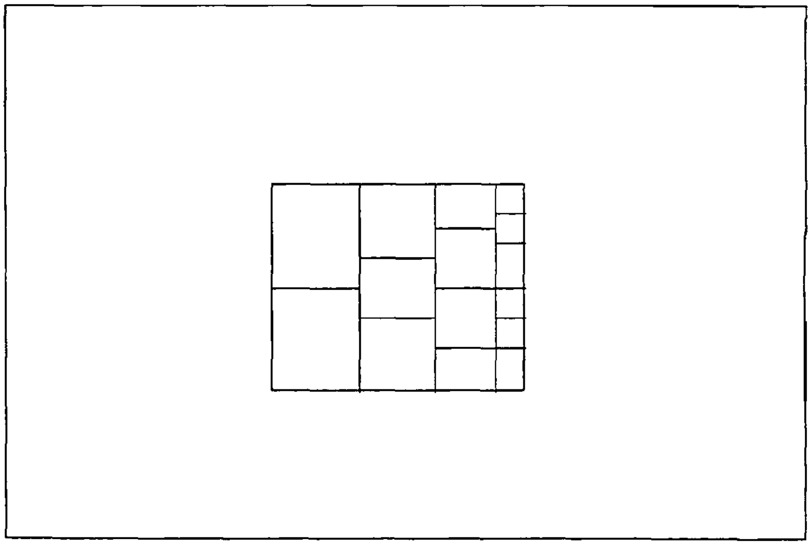

Normally, the amount of light illuminating an object decreases as the irradiated position is further away from the light source. Referring to FIGS. 30 and 31, luminance variations of two points on an object that are different from each other in terms of the distance from the light source will be described. Assume that the imaging device 20, the light source 11 and the object OB are placed as shown in FIG. 30(*a*), and the luminance of the light source 11 varies over time. FIG. 30(*b*) shows an image captured at this time. In FIG. 30(*b*), the light source 11 is illuminating from the right near side. Therefore, the distance between the right pixel C on the object and the light source 11 is shorter than that between the left pixel C and the light source 11. FIG. 31(*a*) shows the luminance variations Lc and Ld of the pixels C and D, respectively. It can be seen from FIG. 31(*a*) that the luminance variation range of the pixel C is significantly different from that of the pixel D. Specifically, the luminance variation depends on the distance between the light source and the object, wherein the range of variation is greater if the distance is smaller, and vice versa.

Therefore, when the luminance variation cycle of the light source is detected in step S32, the luminance variation range is detected for each pixel. Then, a better image segmentation is realized by performing a finer image segmentation for an area where the range of variation is greater, and a more coarse image segmentation for an area where the range of variation is smaller. FIG. 31(*b*) is a diagram showing the results of an image segmentation performed on the image of FIG. 30(*b*). By performing such an image segmentation, it is possible to more accurately perform a photometric linearization process.

The light source information detected in step S32 is not limited to information relating to the luminance variation of the light source. For example, the process may detect the color vector of the light source, which varies over time. For example, with an RGB color camera, an image signal is decomposed into RGB signals, or the like, through a prism or a color filter, and then detected as an electrical signal by a photoelectric conversion device. Thus, the detected luminance value is the product between the characteristics of a prism or a color filter and the color vector of the incident light on the camera. Specifically, when the color vector of the incident light varies over time, the luminance value of the object also varies over time, whereby it is possible to capture images through which the luminance value of the light source varies over time.

Fourth Embodiment

Figure 32:
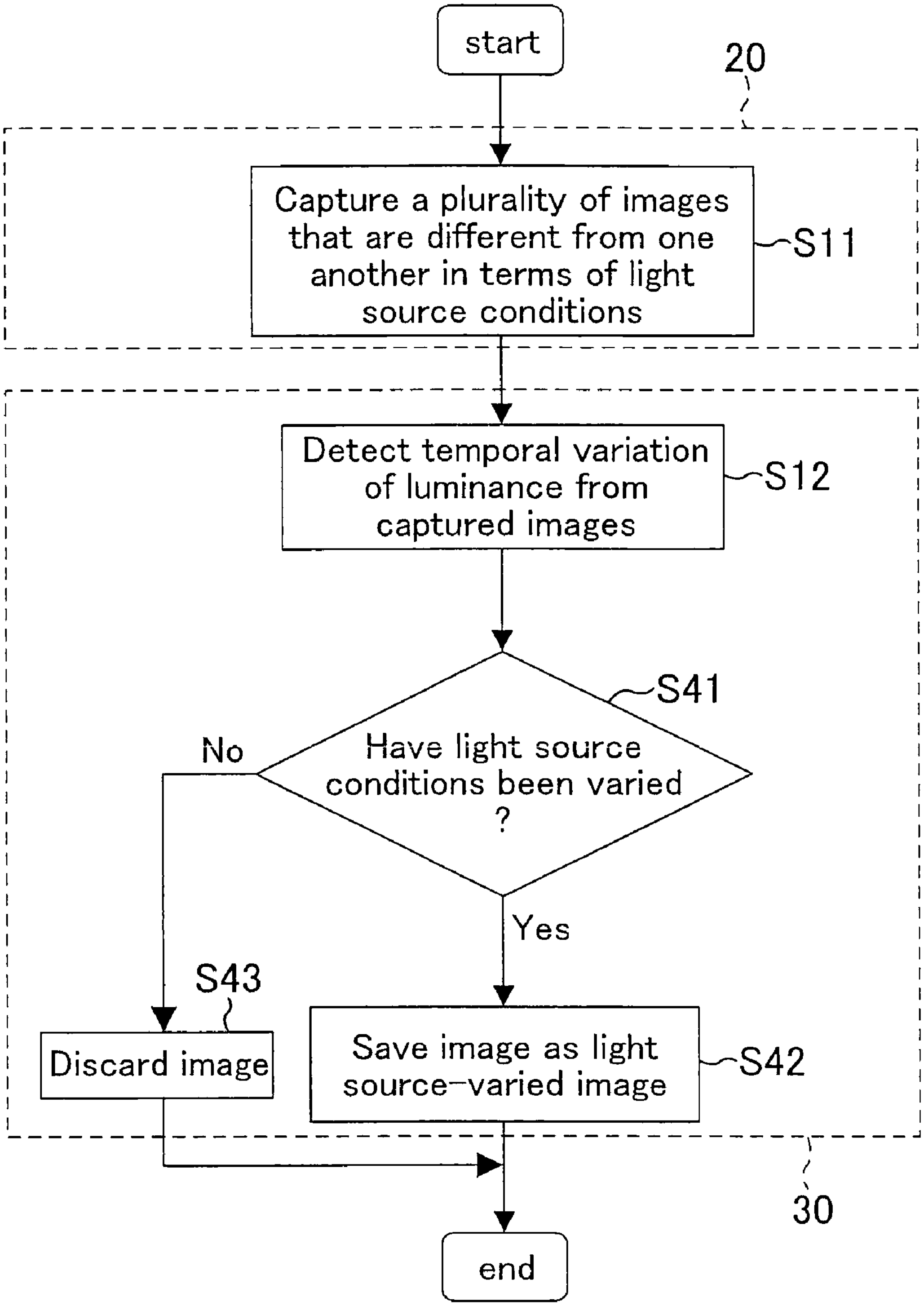
FIG. 32 is a flow chart showing processes of an image processing method according to a fourth embodiment of the present invention.

FIG. 32 is a flow chart showing processes of an image processing method according to a fourth embodiment of the present invention. In FIG. 32, like steps to those of the image processing method of the first embodiment shown in FIG. 2 are denoted by like reference numerals and will not be further described below. Moreover, the configuration of the present embodiment is similar to that of the first embodiment shown in FIG. 1, and will not be described below.

In the present embodiment, the image processing device 30 determines, in step S41, whether the light source conditions of a plurality of images captured in step S11 are different from one another based on the temporal variation of the luminance value for each of the corresponding points detected in step S12. Among the plurality of images, those that are different from one another in terms of the light source conditions are saved as light source-varied images (step S42), while discarding the other images (step S43). Then, an image process is performed (not shown) using the saved light source-varied images. Step S11 corresponds to the imaging step, step S12 corresponds to the luminance variation detection step, and steps S41 to S43 correspond to the image determination step.

Figure 33:
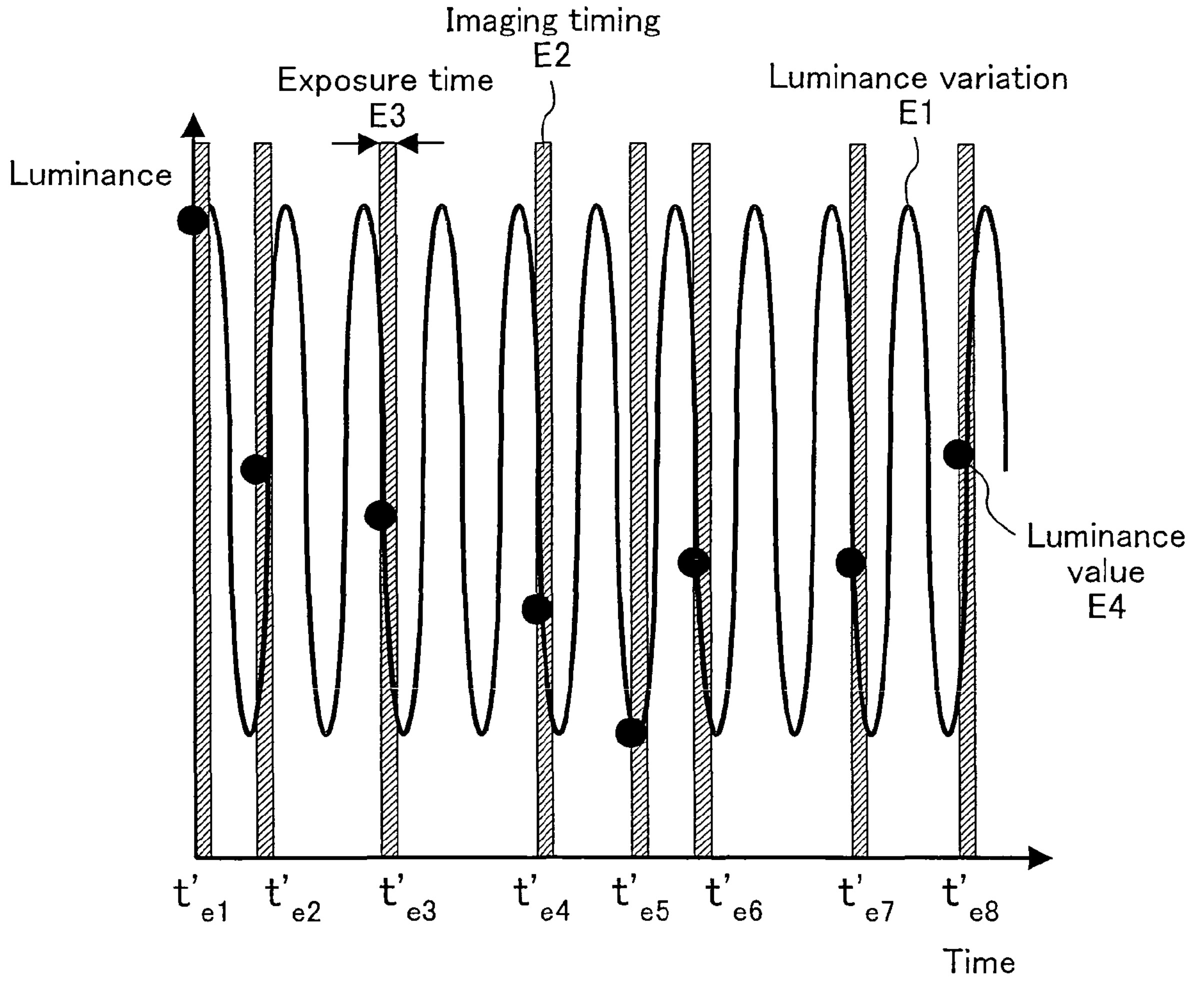
FIG. 33 is a conceptual diagram showing a case where images are captured randomly using a light source whose luminance varies over time.

FIG. 33 is a diagram showing variations of the luminance value in a case where a light source whose luminance varies over time is used. In FIG. 33, E1 denotes the luminance variation at a point on the object, E2 and E3 denote the imaging timing and the exposure time, respectively, of the imaging device 20. Moreover, E4 denotes the observed luminance value. As can be seen from FIG. 33, it is possible to capture images that are different from one another in terms of the luminance. However, images may be captured in phase with the blinking of the light source, e.g., time $t'_{e6}$ and time $t'_{e7}$, thereby obtaining images that are substantially the same in terms of the luminance value E4.

In view of this, in step S41, such images that have been captured in phase with the blinking of the light source are detected and eliminated from the plurality of captured images. This can be done by observing the luminance variations at one or more points on the image, which have been detected in step S12. Herein, the description will be made with respect to a method in which m pixels of the image are selected, and the change in the image is detected by using the luminance values at the m pixels.

The luminance values at m points in the $k^{th}$ image are considered as a vector as follows.

[Expression 22]

$$i'_k = [\, i_{k(p1)} \;\; i_{k(p2)} \;\; \cdots \;\; i_{k(pm)} \,]^T \qquad \text{(Expression 22)}$$

Herein, $i_{k(p)}$ represents the luminance value at the pixel p in the $k^{th}$ image. Now, the $k^{th}$ image detected in step S12 is evaluated according to the following evaluation function $Ev(i'_k)$.

[Expression 23]

$$Ev(i'_k) = \min_{l<k} (i'_l - i'_k)^2 \qquad \text{(Expression 23)}$$

If the value of the evaluation function $Ev(i'_k)$ is sufficiently large (Yes in step S41), it is determined that there is a luminance variation, whereby the $k^{th}$ image is saved as a light source-varied image. If the value of the evaluation function $Ev(i'_k)$ is not sufficiently large (No in step S41), it is determined that there is no luminance variation, whereby the $k^{th}$ image is discarded.

As has already been described, while it is possible to capture images through which the luminance varies over time by appropriately setting the imaging conditions, it is still possible that images may be captured in phase with the blinking of the light source, e.g., time $t'_{e6}$ and time $t'_{e7}$ of FIG. 33, thus capturing images of the same light source conditions. In contrast, in the present embodiment, an image of the same light source conditions as those of an already captured image can be discarded.

The light source-varied images obtained as described above can be subjected to processes such as the photometric linearization, the light source color vector estimation and the background subtraction method as described above in the various embodiments.

As described above, according to the present embodiment, it is possible to obtain light source-varied images, without taking into consideration the imaging interval or the imaging timing, by using the light source whose luminance varies over time and by determining whether the light source conditions of a captured image are the same as those of other images. Thus, even under an ordinary living environment, it is possible to perform an image process without being influenced by shadows and luminance variations of the light source.

Fifth Embodiment

Figure 34:
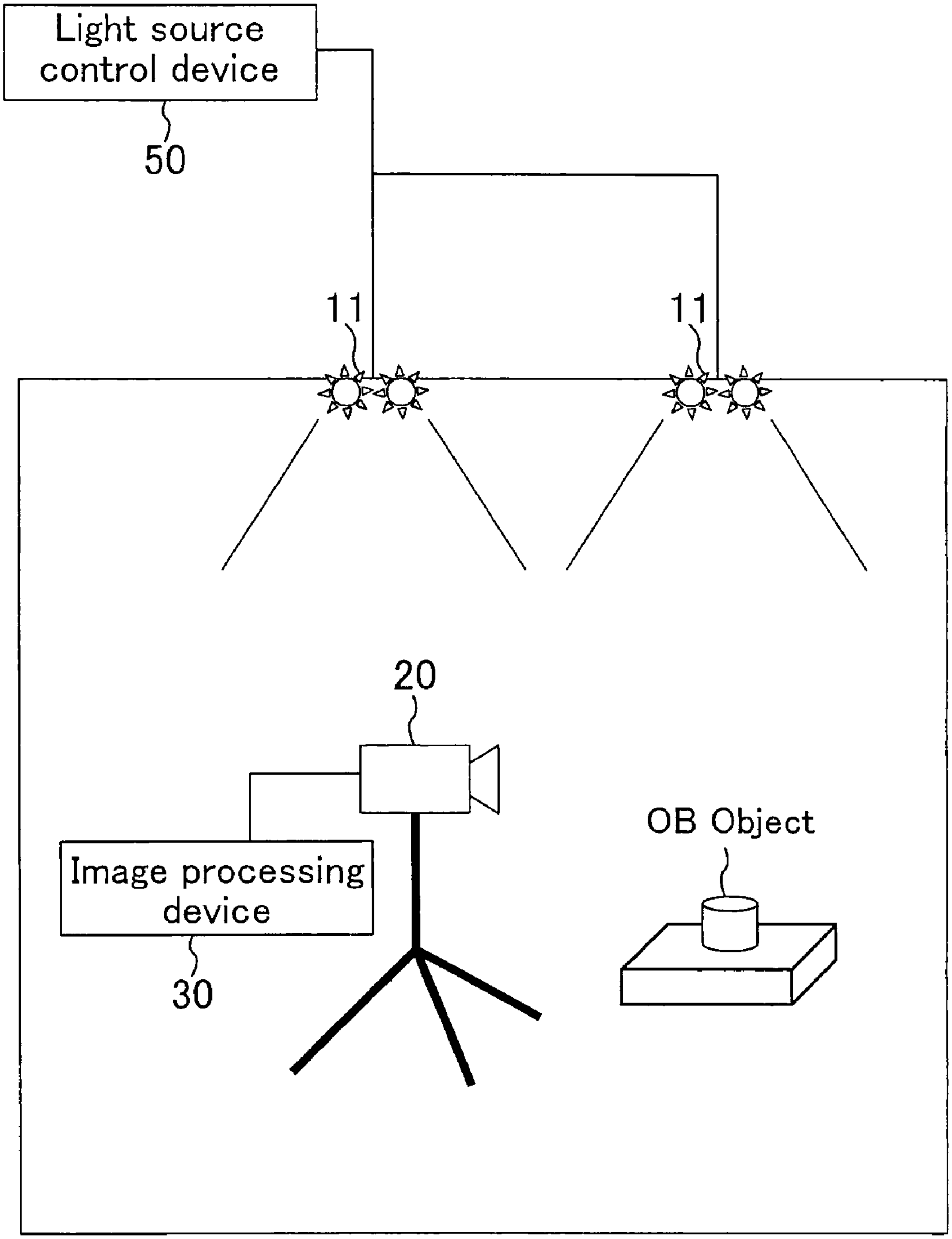
FIG. 34 is a diagram showing a configuration for realizing an image processing method according to a fifth embodiment of the present invention.

FIG. 34 is a diagram showing a configuration for realizing an image processing method according to a fifth embodiment of the present invention. In FIG. 34, like elements to those of FIG. 1 are denoted by like reference numerals to those of FIG. 1, and will not be further described below. The configuration differs from that of FIG. 1 in that a light source control device 50 is provided for controlling a plurality of light sources 11 whose luminance varies over time.

Figure 35:
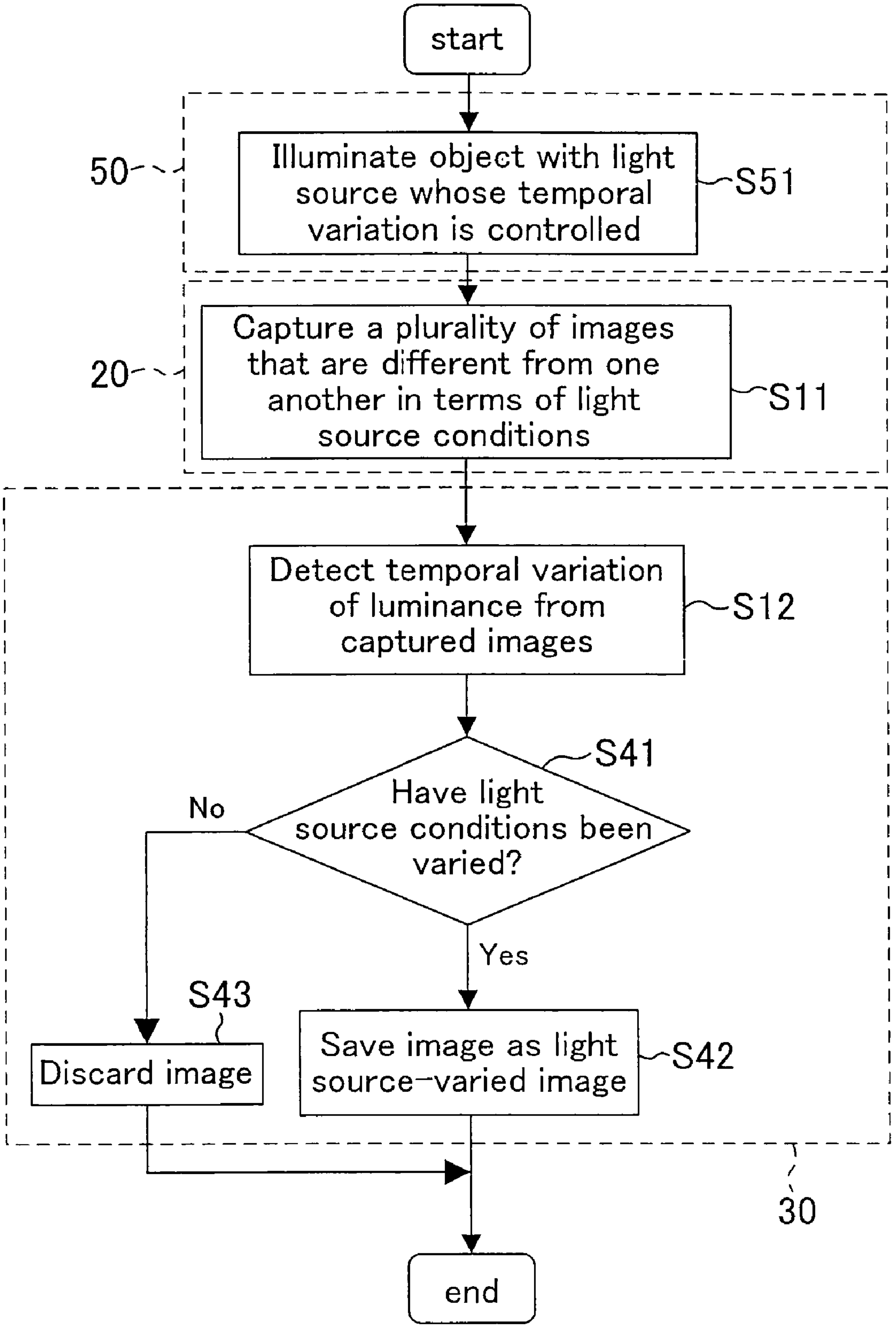
FIG. 35 is a flow chart showing processes of an image processing method according to the fifth embodiment of the present invention.

FIG. 35 is a flow chart showing processes of an image processing method according to the present embodiment. In FIG. 35, like steps to those of the flow chart of FIG. 32 of the fourth embodiment are denoted by like reference numerals to those of FIG. 1, and will not be further described below.

In addition to the steps of the fourth embodiment, the present embodiment further includes step S51 of controlling the temporal luminance variations of the light sources 11. In step S51, the process controls the light sources 11 so as to produce environments that are different from one another in terms of the luminance or the position of the light sources 11.

Conventionally, in an imaging system as shown in FIG. 36, for example, the imaging device 202 captures images in synchronism with the luminance variations of the light source 204 so as to capture light source-varied images through which the position or the luminance of the light source varies. In contrast, in the present embodiment, the light sources 11 whose luminance varies over time are used, and the imaging device 20 randomly captures images without synchronizing the process with the variations of the light sources 11.

As has already been described, while it is possible to capture images through which the luminance varies over time by appropriately setting the imaging conditions, it is still possible that images may be captured in phase with the blinking of the light source, e.g., time $t'_{e6}$ and time $t'_{e7}$ of FIG. 33, thus capturing images of the same light source conditions. In contrast, in the present embodiment, an image of the same light source conditions as those of an already captured image can be discarded.

The light source-varied images obtained as described above can be subjected to processes such as the photometric linearization, the light source color vector estimation and the background subtraction method as described above in the various embodiments.

As described above, according to the present embodiment, it is possible to obtain light source-varied images, without taking into consideration the imaging interval or the imaging timing, by using light sources whose luminance varies over time, controlling the temporal variations of the light sources, and determining whether the light source conditions of a captured image are the same as those of other images. Thus, even under an ordinary living environment, it is possible to perform an image process without being influenced by shadows and luminance variations of the light sources.

The image processes of the various embodiments above can each be realized as a program being executed by a computer.

INDUSTRIAL APPLICABILITY

According to the present invention, it is possible to easily obtain so-called "light source-varied images" without requiring a complicated control such as a synchronization process or large-scale facilities. It is particularly effective, for example, in obtaining information for digital archives, or the like, and in modeling under an ordinary living environment, which is complicated, such as in a house. Moreover, it is also effective in capturing light source-varied images of a large object.

Moreover, according the present invention, it is possible to perform an image process without being influenced by shadows formed by a plurality of light sources and luminance variations of the light sources, which otherwise become problems in an ordinary living environment. Therefore, the present invention is useful as an image processing device, an authentication device, or the like, of a robot or an automobile for use in an ordinary living environment.

The invention claimed is:

1. An image processing method performed by a processor, comprising:

an imaging step of imaging a same object a plurality of times by means of an imaging device under a plurality of light sources which have a same color, whose luminances vary over time differently from each other, and which are fixed at different positions from each other, under an imaging condition of an exposure time that is sufficiently short with respect to a luminance variation cycle of each of the light sources such that a plurality of images that are different from one another in terms of light source conditions can be imaged; and an imaging processing step of performing an image process by using a plurality of images imaged in the imaging step, wherein the image processing step is a step of estimating a color vector of each of the light sources.

2. The image processing method of claim 1, wherein luminance of each of the light sources varies periodically.

3. The image processing method of claim 1, wherein each of the light sources is a fluorescent lamp, an LED or a display.

4. The image processing method of claim 1, comprising:

a step of obtaining light source information of the light sources; and a step of determining the imaging condition based on the obtained light source information.

* * * * *